United States Patent
Matsuda

(10) Patent No.: US 9,232,395 B2
(45) Date of Patent: Jan. 5, 2016

(54) SYSTEM, SERVER, COMMUNICATION DEVICE AND COMPUTER READABLE MEDIUM THEREFOR

(71) Applicant: Munehisa Matsuda, Nagoya (JP)

(72) Inventor: Munehisa Matsuda, Nagoya (JP)

(73) Assignee: BROTHER KOGYO KABUSHIKI KAISHA, Nagoya-Shi, Aichi-Ken (JP)

(*) Notice: Subject to any disclaimer, the term of this patent is extended or adjusted under 35 U.S.C. 154(b) by 196 days.

(21) Appl. No.: 14/020,026

(22) Filed: Sep. 6, 2013

(65) Prior Publication Data

US 2014/0096202 A1 Apr. 3, 2014

(30) Foreign Application Priority Data

Sep. 28, 2012 (JP) ................... 2012-218125

(51) Int. Cl.
*G06F 21/00* (2013.01)
*H04W 12/06* (2009.01)
*H04W 12/08* (2009.01)
*H04W 4/00* (2009.01)
*H04L 29/08* (2006.01)

(52) U.S. Cl.
CPC .............. *H04W 12/06* (2013.01); *H04W 4/008* (2013.01); *H04W 12/08* (2013.01); *H04L 67/02* (2013.01)

(58) Field of Classification Search
CPC ......... G06F 21/30; G06F 21/31; G06F 21/34; G06F 21/35; G06F 21/42; G06F 21/43; H04W 12/06; H04W 12/08
See application file for complete search history.

(56) References Cited

U.S. PATENT DOCUMENTS

| | | | |
|---|---|---|---|
| 2007/0055674 A1 | 3/2007 | Sunada | |
| 2011/0078437 A1* | 3/2011 | Reddy | ........................... 713/155 |
| 2012/0117629 A1 | 5/2012 | Miyazawa et al. | |
| 2012/0239577 A1* | 9/2012 | Wolfs et al. | ..................... 705/64 |

FOREIGN PATENT DOCUMENTS

| | | |
|---|---|---|
| JP | 2004246821 A | 9/2004 |
| JP | 2007072525 A | 3/2007 |
| JP | 2008083906 A | 4/2008 |
| JP | 2009282561 A | 12/2009 |
| JP | 2012113696 A | 6/2012 |

* cited by examiner

*Primary Examiner* — Edward Zee

(74) *Attorney, Agent, or Firm* — Scully, Scott, Murphy & Presser, P.C.

(57) ABSTRACT

Computer-readable instructions, when executed by a processor of a server, cause the server to receive a request from a terminal device, using a protocol configured to be used by a browser of the terminal device. The computer-readable instructions cause the server to generate, in response to receiving the request, specific data. The specific data comprises first location information for location of a web data configured to display a message screen for transmitting target data from the terminal device to a communication device using a short-range wireless communication, and the target data is stored in a memory of the server associated with authentication information configured to authenticate the communication device to a service providing server. The specific data configured to be in a format for transmission using the protocol.

17 Claims, 9 Drawing Sheets

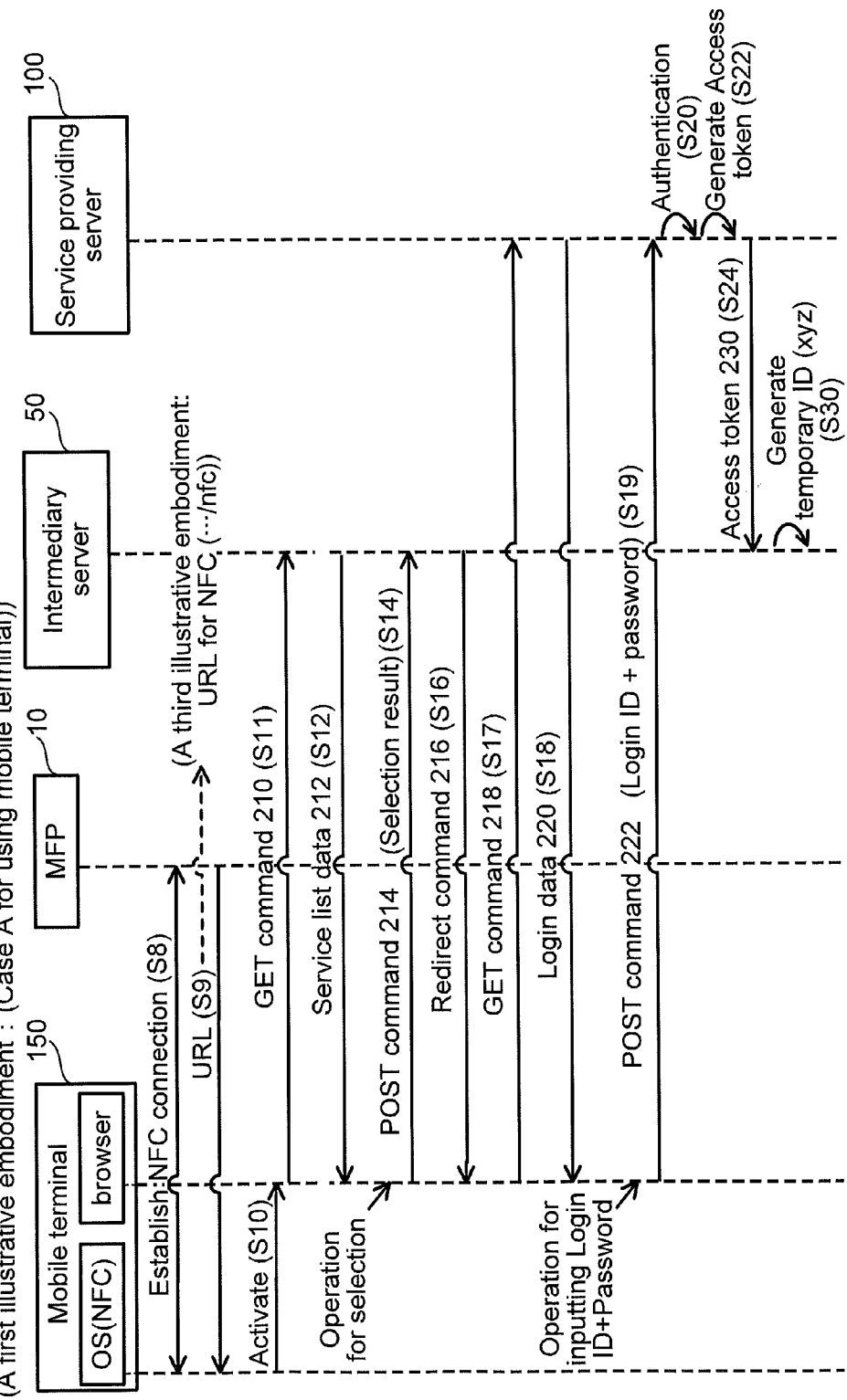

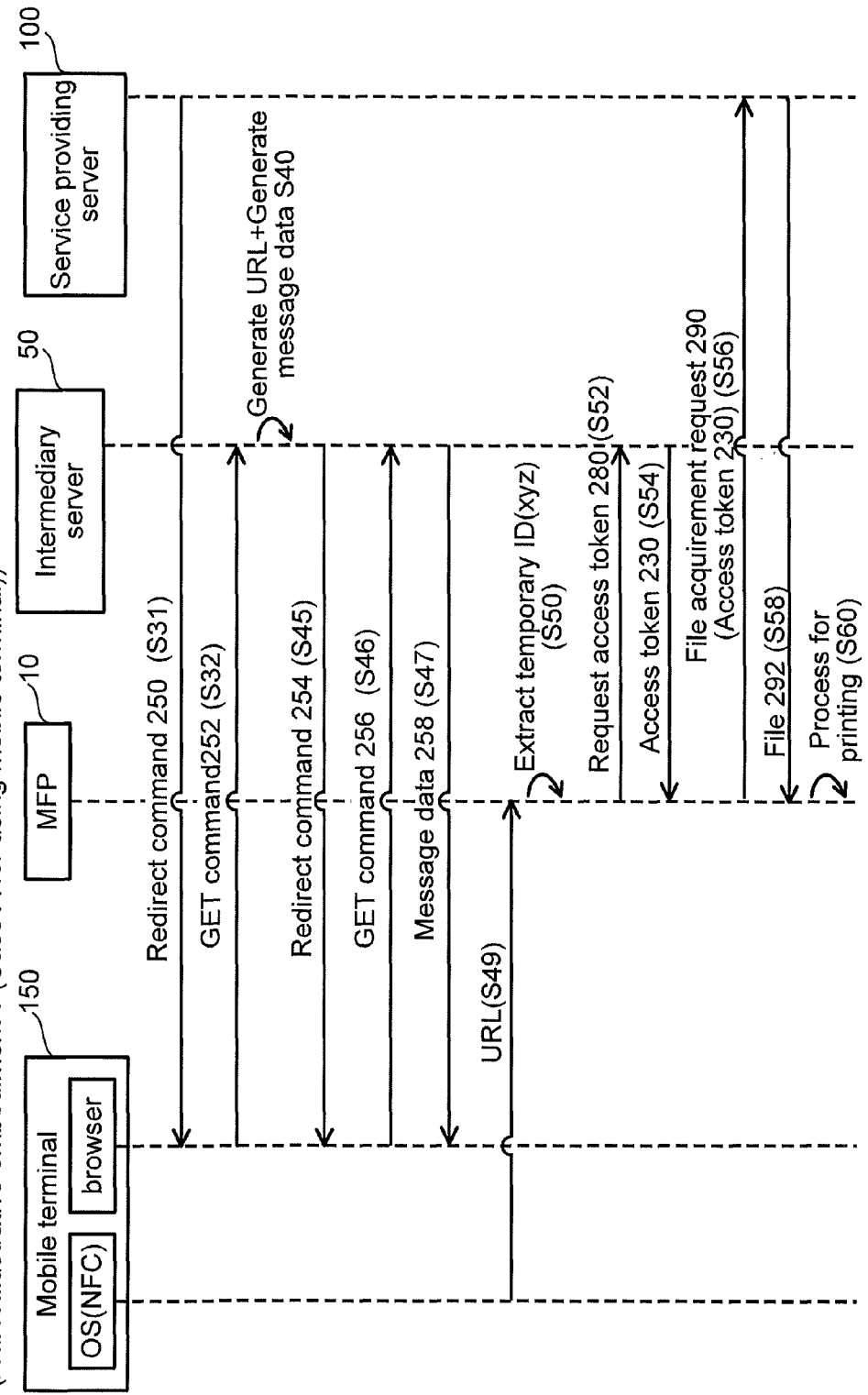

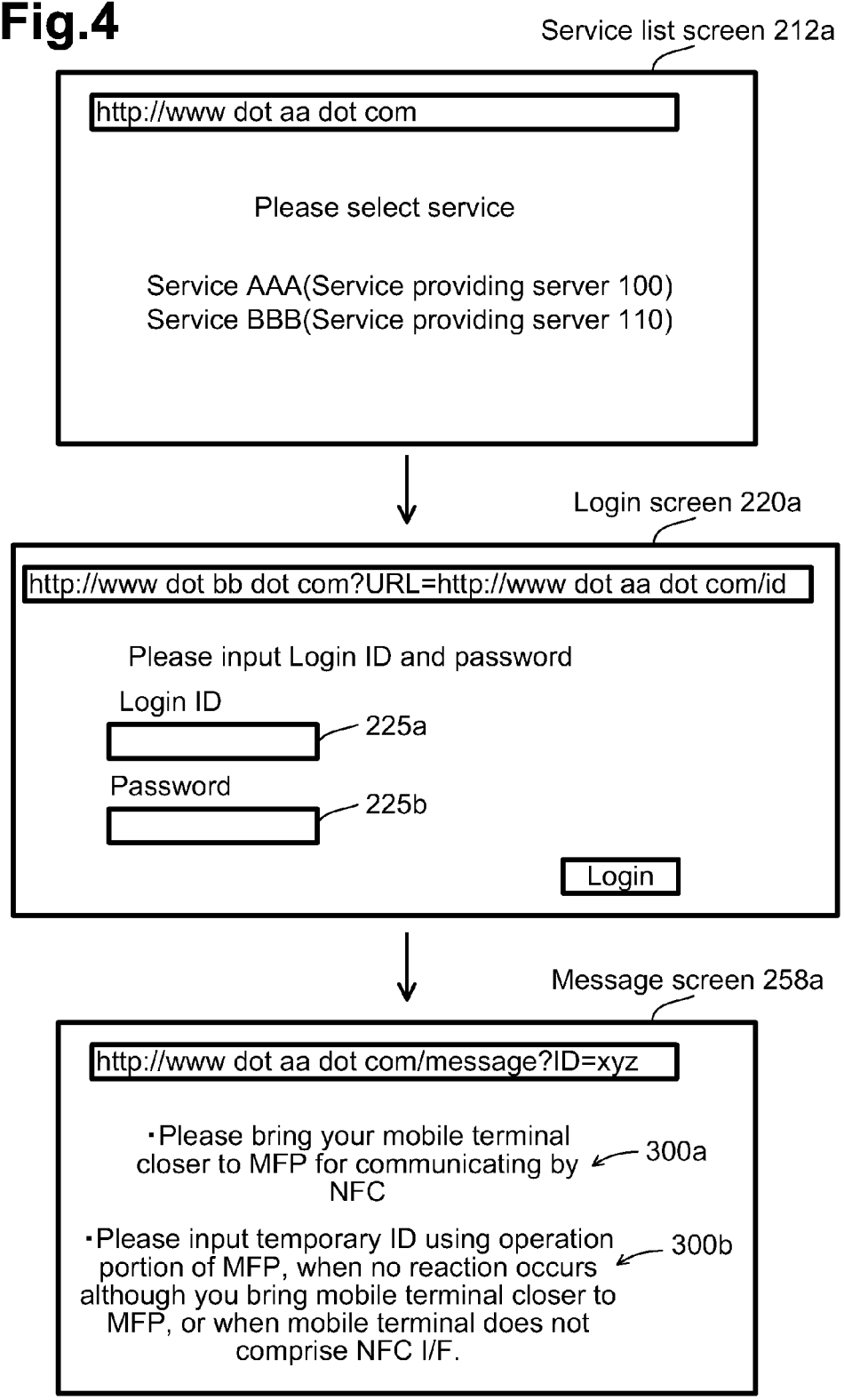

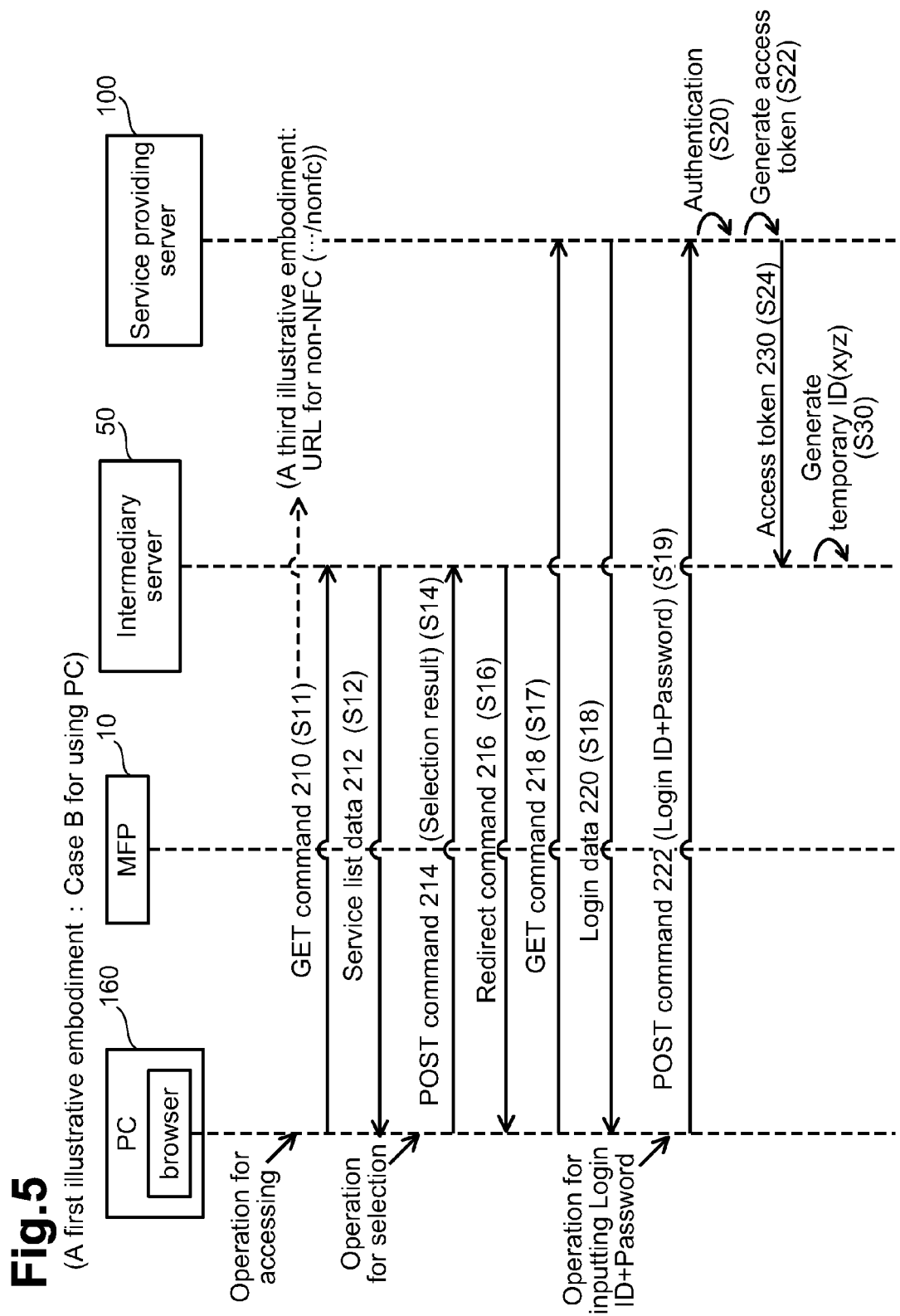

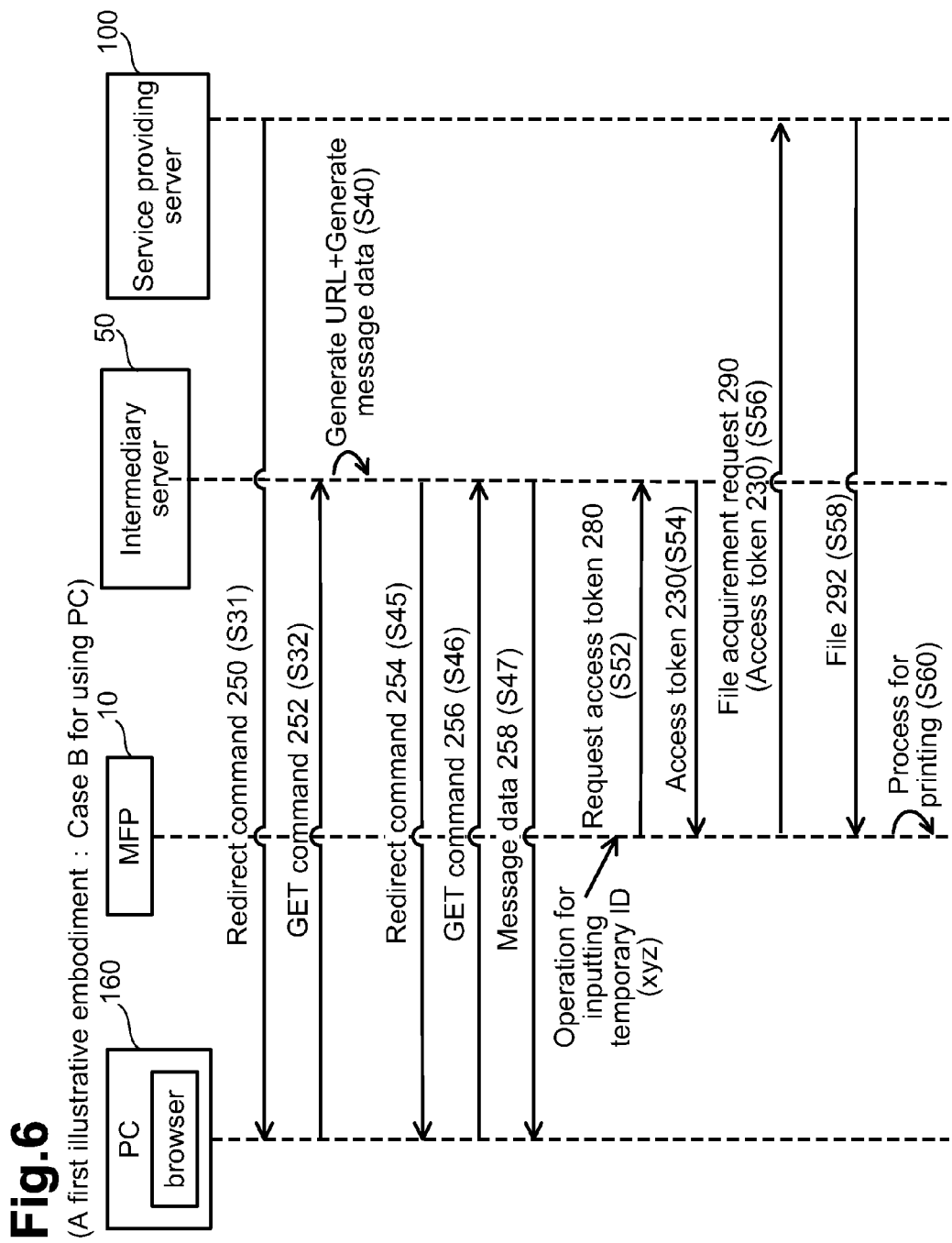

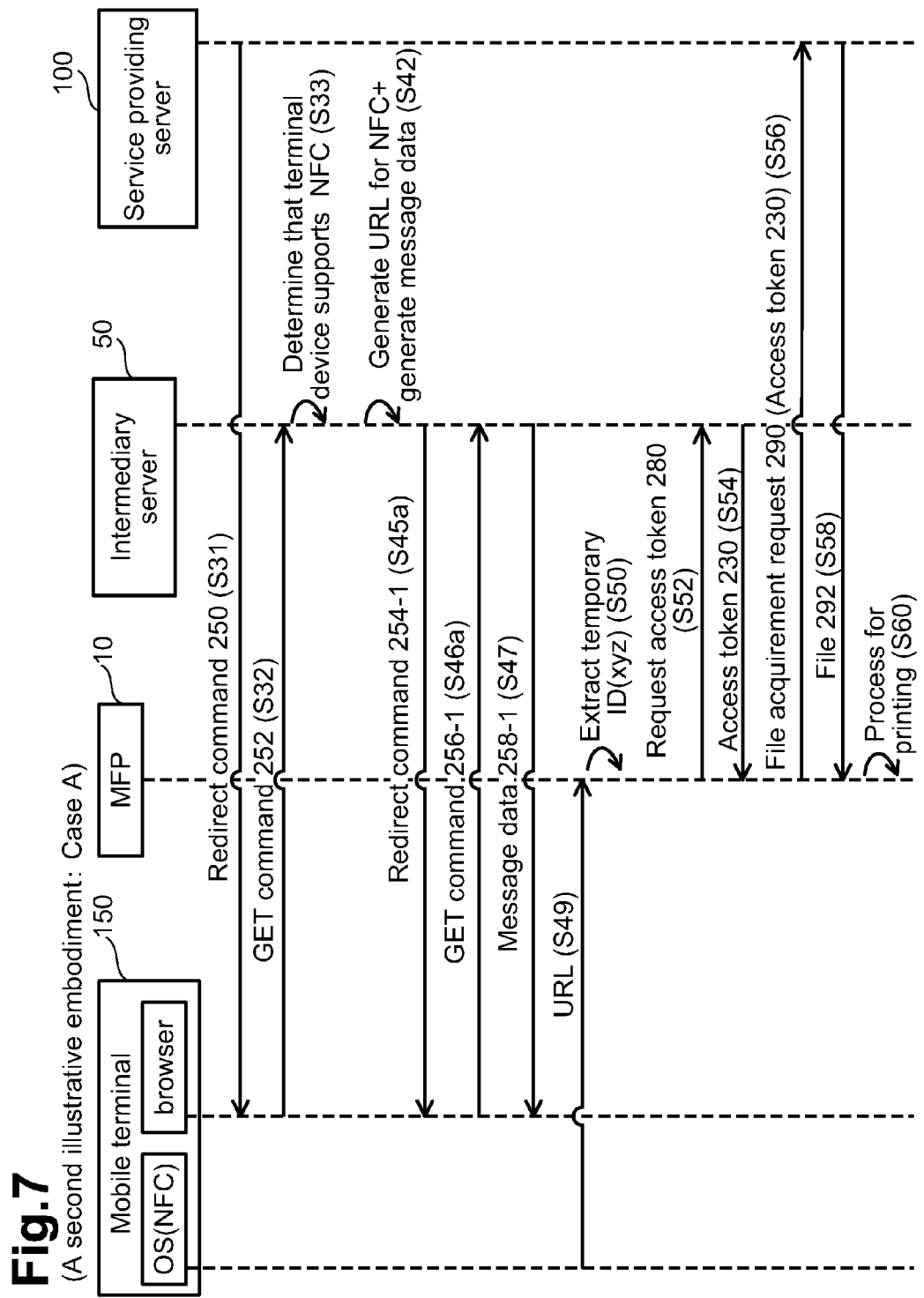

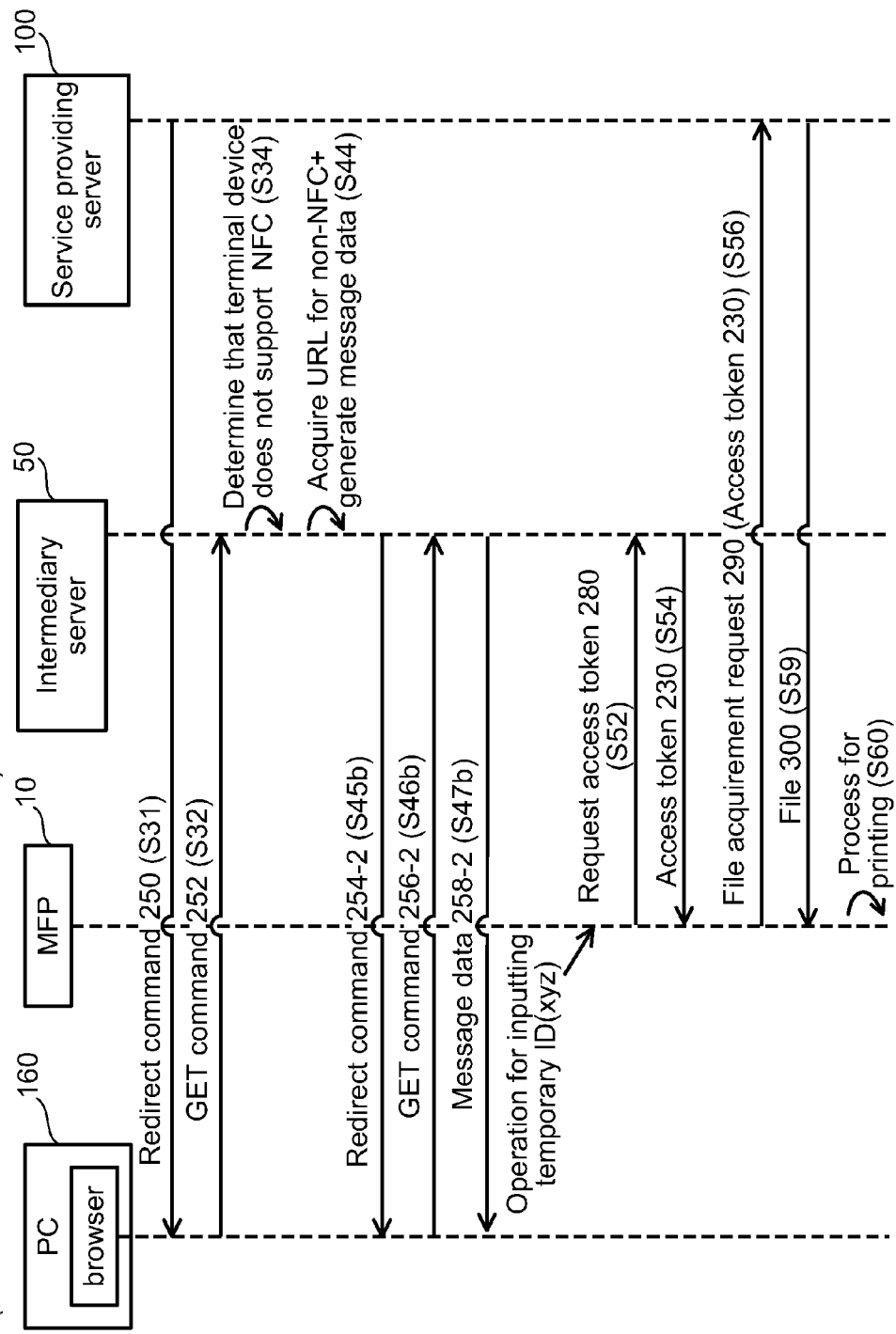

Fig.9A

Message screen 258a-1

> http://www dot aa dot com/message1?ID=xyz
>
> · Please bring your mobile terminal closer — 300a
> to MFP for communicating by NFC
>
> · Please input temporary ID "xyz" using — 300b
> operation portion of MFP, when no
> reaction occurs although you bring mobile
> terminal closer to MFP, or when mobile
> terminal does not comprise NFC I/F.

Fig.9B

Message screen 258a-2

> http://www dot aa dot com/message2
>
> Please input temporary ID "xyz" — 300c
> using operation portion of MFP

Fig.9C

Message screen 258b-1

> http://www dot aa dot com/message1?ID=xyz
>
> · Please bring your mobile terminal closer — 300a
> to MFP for communicating by NFC
>
> · Please input temporary ID "xyz" using — 300d
> operation portion of MFP, when no
> reaction occurs although you bring mobile
> terminal closer to MFP

SYSTEM, SERVER, COMMUNICATION DEVICE AND COMPUTER READABLE MEDIUM THEREFOR

CROSS-REFERENCE TO RELATED APPLICATION

This application claims priority to Japanese Patent Application No. 2012-218125, filed on Sep. 28, 2012, which is incorporated herein by reference.

TECHNICAL FIELD

The specification discloses a server configured to transmit web data to a terminal device, and further discloses a communication device configured to perform wireless communication with the terminal device.

BACKGROUND

For example, in a known technique, a system includes a personal computer ("PC"), a relay device, a multifunction peripheral ("MFP"), and a service providing device. The PC transmits a temporary registration ID issue request to the relay device. Upon receipt of the temporary registration ID issue request, the relay device generates a temporary registration ID and transmits the temporary registration ID to the PC. Thus, the PC displays the temporary registration ID thereon. A user inputs the temporary registration ID displayed on the PC into the MFP by operating the MFP. Upon receipt of the temporary registration ID, the MFP transmits the temporary registration ID to the relay device. Upon receipt of the temporary registration ID, the relay device acquires an access token from the service providing device using the temporary registration ID. In the known technique, the user may need to operate the MFP to input the temporary registration ID into the MFP.

SUMMARY

Embodiments of the disclosure provide for a technique of providing target data to a communication device using a new method. For a more complete understanding of the present disclosure, and the objects, features, and advantages thereof, reference now is made to the following descriptions taken in connection with the accompanying drawings.

One exemplary embodiment of the present disclosure is to provide a system comprising a server and a communication device. The server comprises a first processor and a first memory. The first memory is configured to store authentication information configured to authenticate the communication device to a service providing server, target data associated with the authentication information and first computer-readable instructions therein. The first computer-readable instructions, when executed by the first processor, cause the server to receive a request from a terminal device using a protocol configured to be used by a browser of the terminal device. The first computer-readable instructions cause the server to generate, in response to receiving the request, specific data. The specific data comprises first location information for location on the server of storing web data configured to display a message screen for transmitting target data from the terminal device to a communication device using a short-range wireless communication, and the target data is stored in the first memory associated with the authentication information. The specific data is configured to be in a format for transmission using the protocol. The first computer-readable instructions cause the server to transmit the specific data to the terminal device. The communication device comprises a second processor and a second memory. The second memory is configured to store second computer-readable instructions therein that, when executed by the second processor, cause the communication device to receive the specific data from the terminal device using the short-range wireless communication between the terminal device and the communication device, the specific data comprising the target data. The second computer-readable instructions cause the communication device to transmit the target data to a server. The first computer-readable instructions cause the server to receive from the communication device the target data transmitted by the server to the terminal device. The first computer-readable instructions cause the server to transmit, to the communication device, the authentication information associated with the received target data. The second computer-readable instructions cause the communication device to receive the authentication information from the server, and request authentication to the service providing server using the received authentication information.

Another exemplary embodiment of the disclosure is to provide a non-transitory computer-readable medium storing computer-readable instructions therein. The computer-readable instructions, when executed by a processor of a server, cause the server to receive a request from a terminal device using a protocol configured to be used by a browser of the terminal device. The computer-readable instructions cause the server to generate, in response to receiving the request, specific data. The specific data comprises first location information for location of a web data configured to display a message screen for transmitting target data from the terminal device to a communication device using a short-range wireless communication, and the target data is stored in a memory of the server associated with authentication information configured to authenticate the communication device to a service providing server. The specific data is configured to be in a format for transmission using the protocol. The computer-readable instructions cause the server to transmit the specific data including the target data to the terminal device. The computer-readable instructions cause the server to receive, from the communication device, the target data transmitted by the server to the terminal device, and transmit, to the communication device, the authentication information from the memory, the authentication information associated with the received target data.

A further exemplary embodiment of the disclosure is to provide a communication device comprises a processor and a memory. The memory is configured to store computer-readable instructions therein. The computer-readable instructions, when executed by the processor, cause the communication device to receive specific data from the terminal device using a short-range wireless communication between a terminal device and the communication device. The specific data comprises target data associated with authentication information. The specific data is configured to be in a format for transmission using a protocol configured to be used by a browser of the terminal device. The computer-readable instructions cause the communication device to transmit the target data to a server using a network communication. The computer-readable instructions cause the communication device to receive the authentication information associated with the target data from the server using the network communication, and request authentication to a service providing server using the received authentication information using the network communication.

BRIEF DESCRIPTION OF THE DRAWINGS

FIG. 2 is a sequence diagram depicting operations performed by each device to allow a multifunction peripheral to perform a downloading and printing process by using a mobile terminal in the first illustrative embodiment according to one or more aspects of the disclosure.

FIG. 3 is a continuation of the sequence diagram in FIG. 2 in the first illustrative embodiment according to one or more aspects of the disclosure.

FIG. 4 illustrates examples of various screens displayed on one of the mobile terminal and a personal computer in the first illustrative embodiment according to one or more aspects of the disclosure.

FIG. 5 is a sequence diagram depicting operations performed by each device to allow a multifunction peripheral to perform a downloading and printing process by using the personal computer in the first illustrative embodiment according to one or more aspects of the disclosure.

FIG. 6 is a continuation of the sequence diagram in FIG. 5 in the first illustrative embodiment according to one or more aspects of the disclosure.

FIG. 7 is a continuation of the sequence diagram in FIG. 2 in a second illustrative embodiment according to one or more aspects of the disclosure.

FIG. 8 is a continuation of the sequence diagram in FIG. 5 in the second illustrative embodiment according to one or more aspects of the disclosure.

FIG. 9A illustrates an example of a message screen displayed on the mobile terminal in the first and third illustrative embodiments according to one or more aspects of the disclosure.

FIG. 9B illustrates an example of a message screen displayed on the PC in the second illustrative embodiment according to one or more aspects of the disclosure.

FIG. 9C illustrates an example of a message screen displayed on the mobile terminal in the third illustrative embodiment according to one or more aspects of the disclosure.

DETAILED DESCRIPTION OF EMBODIMENTS

Figure 1:
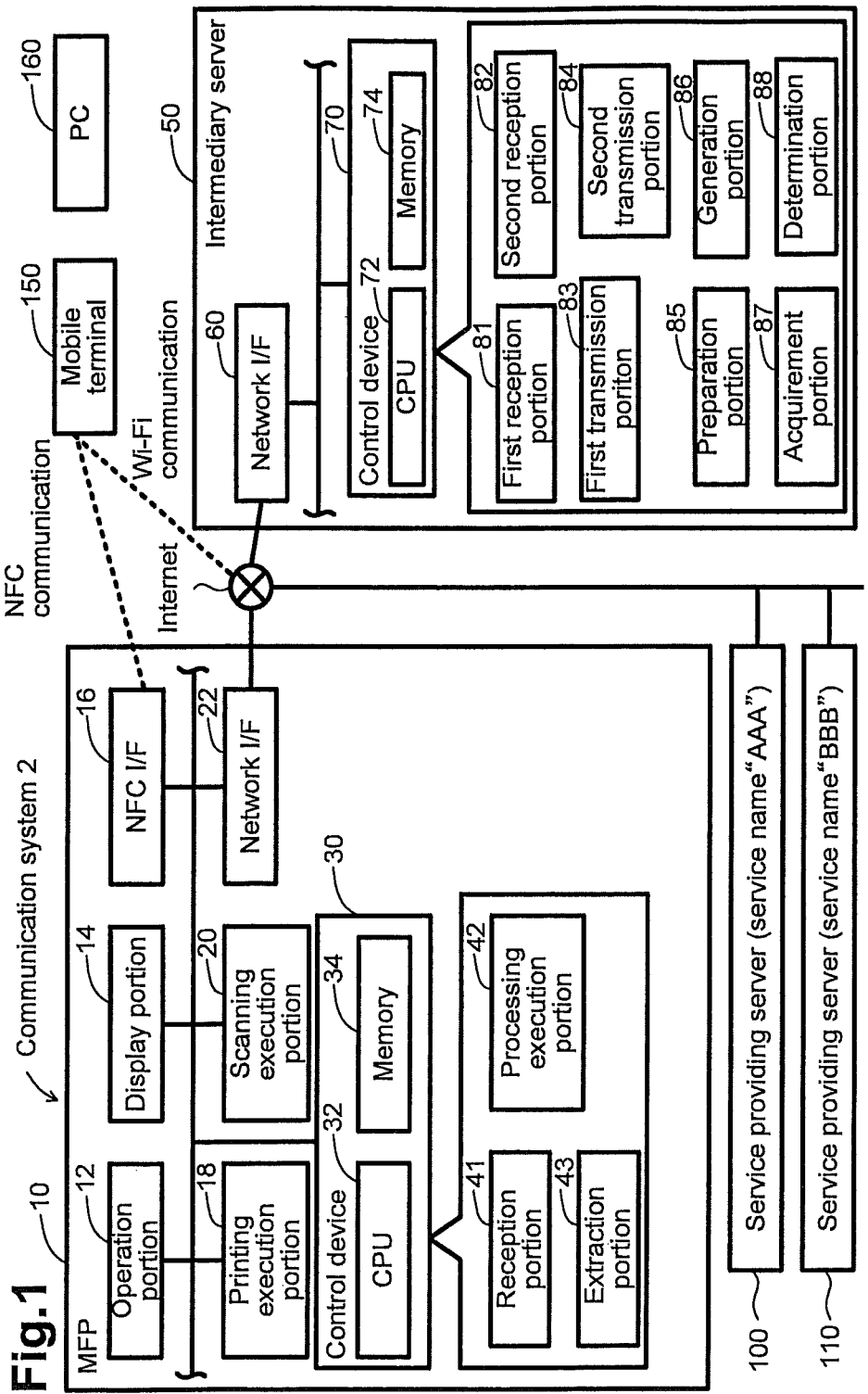
FIG. 1 illustrates a configuration of a communication system in a first illustrative embodiment according to one or more aspects of the disclosure.

A first illustrative embodiment will be described below. As depicted in FIG. 1, a communication system 2 comprises a multifunction peripheral ("MFP") 10, an intermediary server 50, a plurality of service providing servers 100 and 110, a mobile terminal 150, and a personal computer ("PC") 160. Each of the devices 10, 50, 100, 110, 150, and 160 is configured to be accessible to the Internet. Further, each of the MFP 10 and the mobile terminal 150 is configured to perform communication using Near Field Communication ("NFC") system (hereinafter, referred to as "NFC").

The MFP 10 is a peripheral device configured to perform multiple functions, such as one or more of a printing function, a scanning function, a copying function, and a facsimile function. The MFP 10 comprises an operation portion 12, a display portion 14, an NFC interface ("I/F") 16, a printing execution portion 18, a scanning execution portion 20, a network interface ("I/F") 22, and a control device 30. The operation portion 12 comprises a plurality of keys. A user is allowed to input various instructions into the MFP 10 by operating the operation portion 12. The display portion 14 comprises a display configured to display various information thereon. The printing execution portion 18 comprises a printing mechanism of one of an inkjet type and a laser type. The scanning execution portion 20 comprises a scanning mechanism using one of a charged-coupled device ("CCD") and a contact image sensor ("CIS").

The NFC I/F 16 is configured to enable the MFP 10 to perform wireless communication using an NFC system. The NFC system is one of wireless communication systems for so-called short-range wireless communication and in compliance with the International standards, e.g., ISO/IEC 21481 and ISO/IEC 18092. The network I/F 22 is configured to enable the MFP 10 to connect to a local area network ("LAN"). The network I/F 22 is configured to enable the MFP 10 to connect to one of a wired LAN and a wireless LAN. The MFP 10 is configured to be accessible to the Internet via the network I/F 22 (i.e., the LAN).

The control device 30 comprises a central processing unit ("CPU") 32 and a memory 34. The CPU 32 is configured to perform various processing in accordance with programs stored in the memory 34. Each function of a reception portion 41, a processing execution portion 42, and an extraction portion 43 is implemented by the CPU 32 to perform processing in accordance with the programs.

The MFP 10 is allowed to obtain service from one or more service providing servers (e.g., the service providing server 100) by performing processing depicted in FIGS. 2 and 3. For example, the MFP 10 is allowed to download image data from a service providing server and to print an image represented by the image data onto a printing medium (hereinafter, referred to as a "downloading and printing process"). That is, the MFP 10 is configured to perform the downloading and printing process in response to data supply service offered by the service providing server. Further, for example, the MFP 10 is allowed to upload image data generated by scanning to the service providing server (hereinafter, referred to as a "scanning and uploading process"). That is, the MFP 10 is configured to perform the scanning and uploading process in response to data storage service offered by the service providing server.

The intermediary server 50 is provided by a vender of the MFP 10. The intermediary server 50 is configured to mediate service from the one or more service providing servers, e.g., one or more of the service providing servers 100 and 110, to the MFP 10. The intermediary server 50 functions as a Web server configured to provide web data to the mobile terminal 150 and the PC 160. The intermediary server 50 comprises a network interface ("I/F") 60 and a control device 70. The intermediary server 50 is configured to be accessible to the Internet via the network I/F 60.

The control device 70 comprises a CPU 72 and a memory 74. The CPU 72 is configured to perform various processing in accordance with programs stored in the memory 74. Each function of a first reception portion 81, a second reception portion 82, a first transmission portion 83, a second transmission portion 84, a preparation portion 85, a generation portion 86, an acquirement portion 87, and a determination portion 88 is implemented by the CPU 72 to perform processing in accordance with the programs.

Each service providing server 100, 110 are examples of, "Evernote® (Evernote® is a registered trademark owned by Evernote Corporation of Redwood City, Calif.)", "Google Docs™ (Google Docs™ is a trademark owned by Google Inc. of Mountain View, Calif.)" "PICASA® (PICASA® is a registered trademark owned by Google Inc. of Mountain View, Calif.)", and "Facebook®" (Facebook® is a registered trademark owned by Facebook, Inc. of Menlo Park, Calif.)". In the first illustrative embodiment, names of the service providing servers 100 and 110 (i.e., a service name) are "AAA" and "BBB", respectively. The service providing server 100 is configured to offer one or more of data supply service for supplying data to a communication device (e.g., the MFP 10) and data storage service for storing data acquired from a communication device.

The service providing server 100 is provided by a first service provider (i.e., a first company). The service providing server 110 is provided by a second service provider (i.e., a second company) that is a different company from the first service provider. The first service provider opens its first application programming interface ("API") to a communication device such that the communication device becomes enabled to obtain service from the service providing server 100. The second service provider also opens its second API to a communication device such that the communication device becomes enabled to obtain service from the service providing server 110. The first service provider is a different company from the second service provider. Therefore, generally, the first API and the second API are different from each other. A communication device needs to support both of the first and second APIs to obtain service from both of the service providing servers 100 and 110, for example. That is, the communication device needs to be equipped with both a program for using the first API and a program for using the second API.

Accordingly, to obtain service from a plurality of service providing servers, e.g., the service providing servers 100 and 110, the MFP 10 needs to support a plurality of APIs. Therefore, the MFP 10 needs to store a plurality of programs in the memory 34. However, generally, a storage capacity of the memory 34 of the MFP 10 is less than a storage capacity of a memory of the PC 160. Therefore, in the first illustrative embodiment, the intermediary server 50 is provided to enable the MFP 10 to obtain service from the plurality of service providing servers, e.g., the service providing servers 100 and 110, without storing a plurality of programs in the memory 34 of the MFP 10.

That is, the intermediary server 50 is configured to support a plurality of APIs for the plurality of service providing servers, e.g., the service providing servers 100 and 110. The intermediary server 50 is configured to perform communication (e.g., communication to acquire an access token) with one or more of the service providing servers 100 and 110 using an appropriate one of the APIs of the service providing servers 100 and 110 to enable the MFP to obtain service from one or more of the service providing servers 100 and 110. Thus, the MFP 10 can obtain service from one or more of the service providing servers 100 and 110 although the MFP 10 does not support the APIs for the service providing servers 100 and 110 (i.e., the MFP 10 does not store the plurality of programs therein). Further, when specifications of one or more of the service providing servers 100 and 110 are changed, the only requirement is to change the program of the intermediary server 50. With the change of the program of the intermediary server 50, the MFP 10 can respond to the specification change of one or more of the service providing servers 100 and 110 while the programs of the MFP 10 are not changed. Furthermore, the program of the intermediary server 50 is changed to support one or more APIs of one or more new service providing servers. With this program change in the intermediary server 50, the MFP 10 becomes enabled to obtain service from one or more of the new service providing servers while the programs of the MFP 10 are not changed.

The mobile terminal 150 is a portable terminal device. The portable terminal device comprises, for example, a mobile phone (e.g., a smartphone), a personal digital assistant ("PDA"), a notebook PC, a tablet PC, a portable audio player, and a portable video player. The mobile terminal 150 comprises an interface for performing NFC and an interface for wireless communication in compliance with a wireless communication standard created by the Wi-Fi Alliance. Hereinafter, wireless communication is referred to as "Wi-Fi communication".

The mobile terminal 150 comprises a known operating system ("OS") program (e.g., Android™ operating system (Android™ is a trademark owned by Google Inc. of Mountain View, Calif.)) that supports both of NFC and Wi-Fi communication. The mobile terminal 150 further comprises a known Web browser program. Nevertheless, the mobile terminal 150 does not comprise a special application program for extracting a temporary ID from web data and transmitting the temporary ID to the MFP 10 via NFC. The mobile terminal 150 is configured to perform Wi-Fi communication to access the Internet. Nevertheless, in the first illustrative embodiment, it is assumed that the mobile terminal 150 is connected to the LAN that is different from the LAN to which the MFP 10 is connected.

Here, difference between NFC and Wi-Fi communication is described. NFC is wireless communication in compliance with the International standards, e.g., ISO/IEC 21481 and ISO/IEC 18092, as described above. Wi-Fi communication is, for example, wireless communication in compliance with the standard IEEE 802.11 and its family standards (e.g., IEEE 802.11a, 802.11b, 802.11g, 802.11n) (IEEE stands for The Institute of Electrical and Electronics Engineers, Inc.). A communication speed (e.g., a maximum communication speed=100 to 424 Kbps) of NFC is typically slower than a communication speed (e.g., a maximum communication speed=11 to 600 Mbps) of Wi-Fi communication. A frequency of a carrier (e.g., 13.56 MHz band) in NFC is different from a frequency of a carrier (e.g., 2.4 GHz band or 5.0 GHz band) in Wi-Fi communication. A communicable range of NFC (e.g., 10 cm or shorter) is shorter than a communicable range of Wi-Fi communication (e.g., 100 m or shorter). HTTP communication, that is, communication using HTTP protocol, can be performed using Wi-Fi communication.

The PC 160 is a terminal device that comprises, for example, a desktop PC, a notebook PC, and a tablet PC. The PC 160 is configured not to perform NFC, in contrast to the mobile terminal 150. The PC 160 comprises a known operating system ("OS") program (e.g., Windows® operating system (Windows® is a registered trademark owned by Microsoft corporation of Redmond, Wash.)) that supports Wi-Fi communication. The PC 160 further comprises a known Web browser program. The PC 160 is configured to be accessible to the Internet by performing Wi-Fi communication. In the first illustrative embodiment, it is assumed that the PC 160 is connected to a LAN that is different from the LAN to which the MFP 10 is connected.

The user needs to prepare the MFP 10 to obtain service from each of the service providing servers 100 and 110 as described below. The user accesses, for example, the service providing server 100, by using a terminal device, for example, one of the mobile terminal 150 and the PC 160, to enter a login ID and a password into the service providing server 100 using a known method. With the completion of the preparation, the user is then allowed to obtain service from the service providing server 100 through the terminal device. For example, the user is allowed to upload a file including image data to the service providing server 100 in response to the data storage service from the service providing server 100. After that, when the user desires to let the MFP 10 print the uploaded file (i.e., when the user allows the MFP 10 to perform the downloading and printing process), each of the devices 10, 50, 100, and 150, performs processing depicted in FIGS. 2 and 3.

The MFP 10 needs to acquire an access token generated by the service providing server 100 in order to perform the downloading and printing process in response to the data supply service from the service providing server 100. A method of providing the MFP 10 with an access token comprises a method using the mobile terminal 150 configured to perform NFC and a method using the PC 160 not configured to perform NFC. Hereinafter, first, the method using the mobile terminal 150 will be described with reference to FIGS. 2 and 3, and the method using the PC 160 will be then described with reference to FIGS. 5 and 6.

Referring to FIG. 2, case A in which the mobile terminal 150 is used will be described. The user of the mobile terminal 150 brings the mobile terminal 150 closer to the MFP 10 to establish an NFC connection between the mobile terminal 150 and the MFP 10. While the power of the MFP 10 is on, the NFC I/F 16 of the MFP 10 issues detection radio waves to detect a device that can perform NFC (e.g., the mobile terminal 150). An NFC I/F (not depicted) of the mobile terminal 150 also issues detection radio waves to detect a device that can perform NFC (e.g., the MFP 10). When a distance between the MFP 10 and the mobile terminal 150 becomes a distance that their detection radio waves are detected at the devices each other or shorter (e.g., 10 cm), one of the MFP 10 and the mobile terminal 150 receives radio waves from the other of the MFP 10 and the mobile terminal 150 and transmits response radio waves to the other of the MFP 10 and the mobile terminal 150. Thus, in step S8 of FIG. 2, an NFC connection is established between the MFP 10 and the mobile terminal 150.

The memory 34 of the MFP 10 prestores a uniform resource locator ("URL"), for example "http://www$_{dot}$aa$_{dot}$com" of the intermediary server 50. When an NFC connection is established between the MFP 10 and the mobile terminal 150, in step S9 of FIG. 2, the control device 30 of the MFP 10 transmits the URL of the intermediary server 50 stored in the memory 34 to the mobile terminal 150 using the NFC.

In step S10 of FIG. 2, when the URL of the intermediary server 50 is received as a result of NFC, the OS program of the mobile terminal 150 starts a Web browser of the mobile terminal 150. Such a Web browser start mechanism is preinstalled in the OS program. Therefore, the OS program of the mobile terminal 150 is enabled to start the Web browser without a special application program installed on the mobile terminal 150.

The mobile terminal 150 accesses the URL of the intermediary server 50 using the Web browser. Hereinafter, the OS program of the mobile terminal 150 and the browser program of the mobile terminal 150 are referred to as a "mobile terminal 150 (OS)" and a "mobile terminal 150 (browser)", respectively. The method by which the mobile terminal 150 (browser) accesses the URL of the intermediary server 50 will be described below.

The mobile terminal 150 (browser) acquires an IP address of the intermediary server 50 from a domain name system ("DNS") server using a server name "www.aa.com" of the URL "http://www$_{dot}$aa$_{dot}$com" of the intermediary server 50. Then, the mobile terminal 150 (browser) generates a GET command of a hypertext transfer protocol ("HTTP") comprising the acquired IP address as a sending-destination IP address. Therefore, the GET command comprises the IP address of the intermediary server 50 but does not comprises the exact URL of the intermediary server 50. Nevertheless, the IP address of the intermediary server 50 is acquired by which the name of the URL of the intermediary server 50 is changed. Therefore, the IP address of the intermediary server 50 is information that is equivalent to the URL of the intermediary server 50. Thus, it could be suggested that a situation where the GET command comprises the IP address of the intermediary server 50 is equivalent to a situation where the GET command comprises the URL of the intermediary server 50. Accordingly, in the first illustrative embodiment, it may be expressed that "the GET command comprises the URL" under a situation where a device (e.g., the mobile terminal 150) accesses a URL to transmit a GET command although the GET command does not comprise the exact URL in reality.

It is assumed that the URL to be accessed using the mobile terminal 150 (browser) is, for example, a URL "http://www$_{dot}$aa$_{dot}$com/xxx/yyy". Hereinafter, in the URL "http://www$_{dot}$aa$_{dot}$com/xxx/yyy", a part subsequent to the server name "www$_{dot}$aa$_{dot}$com", e.g., "xxx" and "yyy", is referred to as a "resource part". The mobile terminal 150 (browser) acquires an IP address from the DNS server using the server name "www$_{dot}$aa$_{dot}$com" and generates a GET command comprising the acquired IP address as the sending-destination IP address. The GET command further comprises a character string, i.e., "xxx" and "yyy", representing the resource part in the URL. Therefore, the GET command comprises the IP address of the intermediary server 50 and the character string including and subsequent to the resource part in the URL but does not comprises the exact URL. In the first illustrative embodiment, such a GET command is also expressed as "the GET command comprises the URL". In reality, the resource part includes an extension such as ".cgi". Nevertheless, the extension such as ".cgi" is omitted from the description and drawings in the first illustrative embodiment.

The mobile terminal 150 (browser) generates a GET command 210 comprising the URL of the intermediary server 50 as a request destination URL. The GET command 210 comprises the server name "www$_{dot}$aa$_{dot}$com" of the intermediary server 50. That is, the GET command 210 represents a location in the intermediary server 50. Therefore, in step S11 of FIG. 2, the mobile terminal 150 (browser) transmits the GET command 210 to the intermediary server 50 via HTTP communication. Thus, the mobile terminal 150 (browser) becomes enabled to access the URL of the intermediary server 50.

The control device 70 of the intermediary server 50 receives the GET command 210 from the mobile terminal 150 (browser) using HTTP communication. Upon receipt of the GET command 210, the control device 70 acquires service list data 212 from the memory 74. The service list data 212 is web data representing a service list screen 212a depicted in FIG. 4 and has a format interpretable by the mobile terminal 150 (browser). Then, in step S12 of FIG. 2, the control device 70 transmits the service list data 212 to the mobile terminal 150 (browser) using HTTP communication. The service list data 212 comprises the URL of the intermediary server 50 as a page URL of a Web page. More specifically, the service list data 212 comprises the same URL as the request destination URL comprised in the GET command 210 as a URL of the service list screen 212a depicted in FIG. 4.

The mobile terminal 150 (browser) receives the service list data 212 from the intermediary server 50 using HTTP communication. Upon receipt of the service list data 212, the mobile terminal 150 (browser) displays thereon the service list screen 212a (see FIG. 4) represented by the service list data 212. A topmost field on the service list screen 212a represents the URL "http://www$_{dot}$aa$_{dot}$com" in the service list data 212. The service list screen 212a further comprises the service names (i.e., "AAA" and "BBB") of the service providing servers 100 and 110, respectively.

The user selects one service name (e.g., "AAA") and then selects an OK button (not depicted) by operating the mobile terminal 150 while looking at the service list screen 212a on the mobile terminal 150. Thus, the mobile terminal 150 (browser) generates a POST command 214 comprising the selection result (e.g., "AAA"). After that, in step S14 of FIG. 2, the mobile terminal 150 (browser) transmits the POST command 214 to the intermediary server 50 using HTTP communication.

A script for which the mobile terminal 150 (browser) generates the POST command 214 is comprised in the service list data 212. Therefore, the mobile terminal 150 (browser) can generate and transmit the POST command 214 without a special application installed on the mobile terminal 150.

The control device 70 of the intermediary server 50 receives the POST command 214 from the mobile terminal 150 (browser) via HTTP communication. Upon receipt of the POST command 214, the control device 70 generates a URL corresponding to the selection result comprised in the POST command 214. Then, the control device 70 generates a redirect command 216 of the HTTP comprising the generated URL as a redirect URL. The redirect command of the HTTP is for instructing an access to the URL (i.e., the redirect URL) comprised in the redirect command. The redirect URL is, for example, "http://www$_{dot}$bb$_{dot}$com?URL=http://www$_{dot}$aa$_{dot}$com/id".

When the selection result comprised in the POST command 214 represents the service name "AAA" of the service providing server 100, the control device 70 acquires the URL "http://www$_{dot}$ bb$_{dot}$com" of the service providing server 100 from the memory 74. The control device 70 further acquires a URL for performing processing of step S40 in FIG. 3 (hereinafter, referred to as a "return URL") from the memory 74. The return URL is "http://www$_{dot}$aa$_{dot}$com/id" and comprises the server name "www$_{dot}$aa$_{dot}$com" of the intermediary server 50. That is, the return URL represents a location in the intermediary server 50. After that, the control device 70 generates a first combination URL. More specifically, the first combination URL is generated by combination of the URL "http://www$_{dot}$bb$_{dot}$com" of the service providing server 100 and a query part "?URL=http://www$_{dot}$aa$_{dot}$com/id" in which the return URL is described. Hereinafter, in a case where a URL comprises a query part (e.g., a part including and subsequent to "?"), a part preceding the query part (e.g., a part preceding "?") is referred to as a "domain part". For example, in the first combination URL, "http://www$_{dot}$bb$_{dot}$com" is the domain part and "?URL=http://www$_{dot}$aa$_{dot}$com/id" is the query part.

When the selection result comprised in the POST command 214 represents the service name "BBB" of the service providing server 110, the control device 70 generates the first combination URL. The first combination URL is generated by combination of a domain part representing a URL (not depicted) of the service providing server 110 and a query part in which the return URL is described.

The control device 70 generates a redirect command 216 comprising the generated first combination URL as a redirect URL. Then, in step S16 of FIG. 2, the control device 70 transmits the redirect command 216 to the mobile terminal 150 (browser) using HTTP communication.

The mobile terminal 150 (browser) receives the redirect command 216 from the intermediary server 50 using HTTP communication. Upon receipt of the redirect command 216, the mobile terminal 150 (browser) accesses the redirect URL, i.e., the first combination URL, in accordance with the redirect command 216. That is, the mobile terminal 150 (browser) generates a GET command 218 comprising the first combination URL, as the request destination URL. The request destination URL is, for example, "http://www$_{dot}$bb$_{dot}$com?URL=http://www$_{dot}$aa$_{dot}$com/id". In an example depicted in FIG. 2, the domain part "http://www$_{dot}$bb$_{dot}$com" of the request destination URL comprises the server name "www$_{dot}$bb$_{dot}$com" of the service providing server 100. That is, the domain part "http://www$_{dot}$bb$_{dot}$com" represents a location in the service providing server 100. Therefore, in step S17 of FIG. 2, the mobile terminal 150 (browser) transmits the GET command 218 to the service providing server 100 using HTTP communication.

Upon receipt of the GET command 218 from the mobile terminal 150 (browser), the service providing server 100 acquires login data 220 from a memory (not depicted) of the service providing server 100. The login data 220 is web data representing a login screen 220a depicted in FIG. 4. The login data 220 has a format interpretable by the mobile terminal 150 (browser). Then, in step S18 of FIG. 2, the service providing server 100 transmits the login data 220 to the mobile terminal 150 (browser). The login data 220 comprises the first combination URL as a page URL of a Web page. The page URL is, for example, "http://www$_{dot}$bb$_{dot}$com?URL=http://www$_{dot}$aa$_{dot}$com/id". More specifically, the login data 220 comprises the same URL as the request destination URL comprised in the GET command 218, as the page URL of the login screen 220a depicted in FIG. 4.

The service providing server 100 can acquire the first combination URL comprised in the GET command 218. Therefore, the service providing server 110 can transmit a redirect command 250 depicted in FIG. 3 using the return URL "http://www.aa.com/id" described in the query part (e.g., the part including and subsequent to "?") in the first combination URL. A system of transmitting a redirect command using a URL described in a query part in a request destination URL of a GET command is preinstalled in the service providing server 100 in advance.

The mobile terminal 150 (browser) receives the login data 220 from the intermediary server 50 using HTTP communication. Upon receipt of the login data 220, the mobile terminal 150 (browser) displays thereon the login screen 220a (see FIG. 4) represented by the login data 220. A topmost field on the login screen 220a represents the URL of the login data 220, i.e., the first combination URL. The login screen 220a comprises a box 225a in which a login ID is inputted and a box 225b in which a password is inputted.

The user inputs a login ID and a password by operating the mobile terminal 150 while looking at the login screen 220a. That is, the user inputs the login ID and the password that have been registered in the service providing server 100 in advance in the above-described preparation. Then, the user selects an OK button (not depicted) on the login screen 220a. Thus, the mobile terminal 150 (browser) generates a POST command 222 comprising the login ID and the password. A script for which the mobile terminal 150 (browser) generates the POST command 222 is comprised in the login data 220. After that, in step S19 of FIG. 2, the mobile terminal 150 (browser) transmits the POST command 222 to the service providing server 100 using HTTP communication.

In step S20 of FIG. 2, when the service providing server 100 receives the POST command 222 from the mobile terminal 150 (browser), the service providing server 100 performs authentication of the login ID and the password comprised in the POST command 222. When authentication succeeds, in step S22 of FIG. 2, the service providing server 100 generates an access token 230 for the MFP 10 to obtain service from the service providing server 100. After that, in step S24 of FIG. 2, the service providing server 100 transmits the access token 230 to the intermediary server 50.

The acquirement portion 87 of the intermediary server 50 receives the access token 230 from the service providing server 100 using HTTP communication to acquire the access token 230. In response to this, in step S30 of FIG. 2, the generation portion 86 of the intermediary server 50 generates a temporary ID (e.g. a character string "xyz" in the first illustrative embodiment). For example, the temporary ID is generated by random combination of a plurality of characters. Then, the generation portion 86 stores, in the memory 74, the access token 230 and the temporary ID associated with each other. Thus, in FIG. 3, when the intermediary server 50 receives an access token request 280 comprising the temporary ID from the MFP 10, the intermediary server 50 can transmit the access token 230 associated with the temporary ID to the MFP 10.

Referring to FIG. 3, case A will be described below. Case A in FIG. 3 is a continuation of case A depicted in FIG. 2. As described above, the service providing server 100 acquires the first combination URL by receiving the GET command 218 from the mobile terminal 150 (browser) in FIG. 2. The service providing server 100 extracts the return URL "http://www$_{dot}$aa$_{dot}$com/id" comprised in the query part (e.g., the part including and subsequent to "?") from the first combination URL. Then, as depicted in FIG. 3, in step S31 of FIG. 3, the service providing server 100 generates a redirect command 250 comprising the extracted return URL as the redirect URL and transmits the redirect command 250 to the mobile terminal 150 (browser).

The mobile terminal 150 (browser) receives the redirect command 250 from the service providing server 100 via HTTP communication using Wi-Fi communication. In response to this, the mobile terminal 150 (browser) accesses the redirect URL, i.e., the return URL, in accordance with the redirect command 250. That is, the mobile terminal 150 (browser) generates a GET command 252 comprising the return URL as the request destination URL. The return URL comprises the server name "www$_{dot}$aa$_{dot}$com" of the intermediary server 50. Therefore, in step S32 of FIG. 3, the mobile terminal 150 (browser) transmits the GET command 252 to the intermediary server 50 using HTTP communication.

The first reception portion 81 of the intermediary server 50 receives the GET command 252 from the mobile terminal 150 (browser) using HTTP communication. When the control device 70 of the intermediary server 50 recognizes that the request destination URL (i.e., the return URL) in the GET command 252 comprises "/id", the control device 70 starts a program for processing of step S40 of FIG. 3 to perform the processing of step S40 in accordance with the program.

As described above, in the first illustrative embodiment, the intermediary server 50 transmits the redirect command 216 comprising the return URL, i.e., the query part of the first combination URL, to the mobile terminal 150 (browser) (see FIG. 2). Thus, the mobile terminal 150 (browser) accesses the return URL after performing communication of each data 218, 220, 222, 250 with the service providing server 100. Therefore, the mobile terminal 150 (browser) can access the intermediary server 50 to allow the intermediary server 50 to perform the processing of step S40 of FIG. 3 appropriately without an operation in which the user accesses the intermediary server 50 included in the mobile terminal 150 (browser). That is, the mobile terminal 150 (browser) can allow the intermediary server 50 to perform the processing of step S40 of FIG. 3 appropriately by transmitting the GET command 252 to the intermediary server 50.

In step S40 of FIG. 3, the preparation portion 85 of the intermediary server 50 acquires a message URL "http://www$_{dot}$aa$_{dot}$com/message" representing a location of message data 258 from the memory 74. Then, the preparation portion 85 acquires the temporary ID "xyz" generated in step S30 in FIG. 2 from the memory 74. The preparation portion 85 generates a second combination URL "http://www$_{dot}$aa$_{dot}$com/message?ID=xyz". Then second combination URL is generated by combination of the domain part representing the message URL and the query part "?ID=xyz" in which the temporary ID is described.

After that, in step S45 of FIG. 3, the preparation portion 85 generates a redirect command 254 comprising the second combination URL as the redirect URL to prepare the redirect command 254. Then, the first transmission portion 83 of the intermediary server 50 transmits the redirect command 254 to the mobile terminal 150 (browser) using HTTP communication.

In step S40 of FIG. 3, the preparation portion 85 further generates the message data 258. The message data 258 is web data representing a message screen 258a depicted in FIG. 4. The message data 258 has a format interpretable by the mobile terminal 150 (browser). The message data 258 comprises text data representing a message 300a (see FIG. 4) and text data representing a message 300b. The message 300a prompts the user to bring the mobile terminal 150 closer to the MFP 10 such that NFC is performed between the mobile terminal 150 and the MFP 10.

The message 300b prompts the user to input the temporary ID into the MFP 10 by operating the operation portion 12 of the MFP 10 when no reaction occurs although the user brings the mobile terminal 150 closer to the MFP 10, i.e., when NFC is not performed between the mobile terminal 150 and the MFP 10 or when the mobile terminal 150 does not comprise an NFC I/F. In the first illustrative embodiment, the mobile terminal 150 (OS) has a system of transmitting a URL of a Web page displayed by a Web browser via NFC when the Web browser is active as a foreground program at the time of the establishment of the NFC connection. Nevertheless, an OS program that does not have such a system (hereinafter, referred to as a "non-NFC capable OS") may be present. When the mobile terminal 150 is equipped with a non-NFC capable OS although comprising the NFC I/F 16, the mobile terminal 150 cannot transmit the URL of the Web page via NFC. In such a case, when no reaction occurs although the user brings the mobile terminal 150 closer to the MFP 10, the message 300b is indicated to prompt the user to input the temporary ID into the MFP 10.

The memory 74 prestores a template for generating the message data 258. Then template comprises each text data described above. Nevertheless, specific values (e.g., "xyz") of the temporary ID are not generated in the template. Therefore, in step S40 of FIG. 3, the preparation portion 85 generates the temporary ID (e.g., "xyz") in the template to generate the message data 258.

The mobile terminal 150 (browser) receives the redirect command 254 from the intermediary server 50 via Wi-Fi communication (i.e., HTTP communication). In response to this, the mobile terminal 150 (browser) accesses the redirect URL, i.e., the second combination URL, in accordance with the redirect command 254. That is, the mobile terminal 150 (browser) generates a GET command 256 comprising the second combination URL as the request destination URL. The second combination URL comprises the server name "www$_{dot}$aa$_{dot}$com" of the intermediary server 50. Therefore, in step S46 of FIG. 3, the mobile terminal 150 (browser)

transmits the GET command 256 to the intermediary server 50 via Wi-Fi communication (i.e., HTTP communication).

The control device 70 of the intermediary server 50 receives the GET command 256 from the mobile terminal 150 (browser) using HTTP communication. When the control device 70 recognizes that the request destination URL, i.e., the second combination URL, in the GET command 256 comprises a resource part "message", the control device 70 starts a program for transmitting message data 258. Then, in step S47 of FIG. 3, the control device 70 transmits the message data 258 to the mobile terminal 150 (browser) using HTTP communication in accordance with the program that starts. The message data 258 comprises the second combination URL as the page URL of a Web page. More specifically, the message data 258 comprises the same URL as the request destination URL comprised in the GET command 256, as the page URL of the message screen 258a depicted in FIG. 4.

As described above, when the intermediary server 50 receives the GET command 252 from the mobile terminal 150, the intermediary server 50 generates the second combination URL and the message data 258 (e.g., step S40). After that, the intermediary server 50 performs communication of the redirect command 254 and the GET command 256 and then transmits the message data 258 comprising the second combination URL to the mobile terminal 150. Instead of the above configuration, it could be conceivable that a configuration in which the intermediary server 50 transmits the message data 258 comprising the second combination URL as a response to the GET command 252 to the mobile terminal 150 is adopted. That is, a configuration in which communication of the redirect command 254 and the GET command 256 is omitted is adopted.

Nevertheless, in the HTTP system, when the Web server (e.g., the intermediary server 50) receives a GET command from a client (e.g., the mobile terminal 150) and transmits the Web server as a response to the GET command, the request destination URL in the GET command needs to be used as a page URL of the web data. Therefore, if a configuration in which the message data 258 is transmitted to the intermediary server 50 as a response to the GET command 252 is adopted, the intermediary server 50 is forced to describe the return URL "http://www$_{dot}$aa$_{dot}$com/id" that is the request destination URL comprised in the GET command 252, as the page URL of the message data 258, and thus, cannot describe the second combination URL in which the temporary ID, as the page URL of the massage data 258.

In light of the above circumstances, in the first illustrative embodiment, a configuration described below is adopted for the intermediary server 50. More specifically, a configuration in which the intermediary server 50 transmits the redirect command 254 comprising the second combination URL as the redirect URL, but not web data, as a response to the GET command 252 and receives the GET command 256 is adopted as the configuration of the intermediary server 50. As a result, the intermediary server 50 can generate the second combination URL that is the request destination URL in the GET command 256, as the page URL of the message data 258. Thus, the intermediary server 50 can transmit the message data 258 comprising the second combination URL in which the temporary ID is generated, to the mobile terminal 150, as the page URL, appropriately.

The mobile terminal 150 (browser) receives the message data 258 from the intermediary server 50 using HTTP communication. In response to this, the mobile terminal 150 (browser) displays thereon the message screen 258a (see FIG. 4) represented by the message data 258. A topmost field on the message screen 258a represents a URL in the message data 258, i.e., the second combination URL. The message screen 258a comprises the messages 300a and 300b.

The user can notice that the mobile terminal 150 configured to perform NFC needs to be brought closer to the MFP 10 through the message 300a indicated on the message screen 258a. Thus, the user brings the mobile terminal 150 closer to the MFP 10. As a result of this, an NFC connection is established again between the MFP 10 and the mobile terminal 150 (OS).

When the NFC connection is established therebetween, in step S49 of FIG. 3, the mobile terminal 150 (OS) transmits the URL described on the message screen 258a to the MFP 10 via the NFC connection. More specifically, when the NFC connection is established therebetween, the mobile terminal 150 (OS) transmits the second combination URL to the MFP 10 via NFC. As described above, a system in which the mobile terminal 150 transmits a second combination URL as a page URL of a Web page via an NFC connection established while the message screen 258a is displayed is installed on the OS program in advance. That is, the mobile terminal 150 (OS) has a system of transmitting a URL of a Web page displayed by an active Web browser via NFC when the Web browser is active as a foreground program at the time of the establishment of an NFC connection. Therefore, the mobile terminal 150 (OS) can transmit the second combination URL to the MFP 10 via NFC without a special application program installed on the mobile terminal 150. That is, the mobile terminal 150 (OS) can transmit the temporary ID described in the query part of the second combination URL to the MFP 10 via NFC.

The message 300b indicated on the message screen 258a comprises the temporary ID. Therefore, it could be conceivable that a configuration in which the mobile terminal 150 extracts the message 300b indicated on the message screen 258a and transmits the message 300b to the MFP 10 via NFC to provide the MFP 10 with the temporary ID is adopted. However, when the mobile terminal 150 receives web data, i.e., the message data 258, as a result of HTTP communication, a special application program needs to be installed on the mobile terminal 150 to transmit one of the web data itself and a part of a character string of the web data via NFC. In light of the above circumstances, in the first illustrative embodiment, the configuration in which the intermediary server 50 generates the second combination URL in which the temporary ID is generated (e.g., step S40) and transmits the message data 258 comprising the second combination URL as the page URL to the mobile terminal 150 is adopted. With this configuration, the mobile terminal 150 (OS) is configured to transmit the second combination URL to the MFP 10 via NFC without a special application program installed on the mobile terminal 150. Thus, the mobile terminal 150 can provide the MFP 10 with the temporary ID appropriately.

The reception portion 41 of the MFP 10 receives the second combination URL from the mobile terminal 150 (OS) via NFC. In response to this, in step S50 of FIG. 3, the extraction portion 43 of the MFP 10 extracts the temporary ID from the second combination URL. More specifically, the extraction portion 43 finds out a character string "ID=" representing a beginning of the temporary ID from the query part of the second combination URL and extracts the character string "xyz" described subsequent to the character string "ID=".

Then, in step S52 of FIG. 3, the processing execution portion 42 of the MFP 10 generates an access token request 280 comprising the extracted temporary ID and transmits the access token request 280 to the intermediary server 50 using HTTP communication. The access token request 280 may be one of a GET command of the HTTP and a POST command of the HTTP.

The second reception portion 82 of the intermediary server 50 receives the access token request 280 from the MFP 10 using HTTP communication. In response to this, the second transmission portion 84 of the intermediary server 50 reads out the access token 230 associated with the temporary ID "xyz" comprised in the access token request 280 from the memory 74. Then, in step S54 of FIG. 3, the second transmission portion 84 transmits the access token 230 to the MFP 10 using HTTP communication.

For example, when a plurality of users perform the processing depicted in FIGS. 2 and 3 at the same time, the intermediary server 50 may store a plurality of access tokens for the plurality of users in the memory 74 simultaneously. Therefore, if the temporary ID and the access token are not associated with each other in the memory 74, the intermediary server 50 cannot determine which one of the plurality of access tokens should be transmitted to the MFP 10 when the intermediary server 50 receives the access token request 280. In the first illustrative embodiment, in step S30 in FIG. 2, the intermediary server 50 stores, in the memory 74, the access token and the temporary ID associated with each other. With this configuration, the intermediary server 50 can transmit an appropriate access token 230 associated with the temporary ID to the MFP 10 when receiving the access token request 280 from the MFP 10.

The processing execution portion 42 of the MFP 10 receives the access token 230 from the intermediary server 50 using HTTP communication. In response to this, the processing execution portion 42 performs processing to obtain the data supply service from the service providing server 100 using the access token 230. That is, in step S56 of FIG. 3, the processing execution portion 42 transmits a file acquirement request 290 (e.g., a GET command of the HTTP) comprising the access token 230 to the service providing server 100 using HTTP communication.

When the service providing server 100 receives the file acquirement request 290 from the MFP 10, the service providing server 100 performs authentication using the access token 230 comprised in the file acquirement request 290. That is, the service providing server 100 determines whether the received access token 230 is an access token generated by the service providing server 100 itself. When authentication of the access token 230 succeeds, in step S58 of FIG. 3, the service providing server 100 transmits a file 292 that was uploaded to the service providing server 100 before by the user, to the MFP 10. That is, the service providing server 100 offers the data supply service.

When the processing execution portion 42 of the MFP 10 receives the file 292 from the service providing server 100, the processing execution portion 42 provides the printing execution portion 18 with image data comprised in the file 292. In step S60 of FIG. 3, the printing execution portion 18 prints an image represented by the image data onto a printing medium. Thus, the MFP 10 can perform the downloading and printing process in response to the data supply service from the service providing server 100. That is, the user of the mobile terminal 150 can allow the MFP 10 to perform the downloading and printing process via the mobile terminal 150.

Next, referring to FIG. 5, case B in which the PC 160 is used will be described. The PC 160 is configured not to perform NFC. Therefore, the PC 160 is configured to perform each communication depicted in FIGS. 5 and 6 via Wi-Fi communication or via wired communication through the wired LAN.

The user starts a browser of the PC 160 and inputs the URL of the intermediary server 50 by using an operation device, such as a keyboard and a mouse. The URL "http://www.aa-.com" of the intermediary server 50 inputted at this time is the same as the URL of the intermediary server 50 received by the mobile terminal 150 (OS) from the MFP 10 as the result of NFC in case A in FIG. 2. The user of the PC 60 is notified in advance of the URL of the intermediary server 50. For example, the URL of the intermediary server 50 is described in an instruction manual of the MFP 10.

The PC 160 accesses the URL of the intermediary server 50. That is, in step S11 of FIG. 5, the PC 160 transmits a GET command 210 comprising the URL of the intermediary server 50 as the request destination URL to the intermediary server 50. Details of processing including and subsequent to this processing are similar to the details of the processing performed in case A in FIG. 2.

Referring to FIG. 6, case B will be described below. Case B in FIG. 6 is a continuation of case B depicted in FIG. 5. A detail of processing in each step until the PC 160 receives the message data 258 from the intermediary server 50 is the same as the detail of the processing in each step in case A in FIG. 3. When the PC 160 receives the message data 258 from the intermediary server 50, the PC 160 displays thereon the message screen 258a (see FIG. 4). The user knows that the PC 160 is configured not to perform NFC. Therefore, the user inputs the temporary ID "xyz" by operating the operation portion 12 of the MFP 10 in accordance with the message 300b indicated on the message screen 258a.

When the processing execution portion 42 of the MFP 10 receives the temporary ID "xyz", in step S52 of FIG. 6, the processing execution portion 42 transmits an access token request 280 comprising the temporary ID "xyz" to the intermediary server 50, similar to case A in FIG. 3. Then, in step S54 of FIG. 6, the processing execution portion 42 of the MFP 10 receives the access token 230 from the intermediary server 50. Details of processing including and subsequent to this processing are similar to the details of the processing performed in case A in FIG. 3. As a result of this, the user of the PC 160 is allowed to let the MFP 10 perform the downloading and printing process via the PC 160.

In the first illustrative embodiment, in both of case A in FIG. 3 and case B in FIG. 6, once the control device 30 of the MFP 10 performs the downloading and printing process using the access token 230, the control device 30 abandons the access token 230. That is, the control device 30 of the MFP 10 erases the access token 230 from the memory 34. Nevertheless, in other embodiments, for example, the control device 30 may store the access token 230 in the memory 34 continuously with the access token 230 associated with a user name (e.g., a user name inputted in the operation portion 12) and the service name of the service providing server 100. In this case, for example, when the user desires to let the MFP 10 perform the downloading and printing process again in response to the data supply service from the service providing server 100, the MFP 10 can perform the downloading and printing process using the access token 230 stored in the memory 34.

According to the first illustrative embodiment, when the MFP 10 has a Web server function and the mobile terminal 150 and the MFP 10 are connected to the same LAN, the user is allowed to access the Web server of the MFP 10 by using, for example, the mobile terminal 150 after acquiring the temporary ID from the message 300b (see FIG. 4) indicated on the message screen 258a. Then, the user can provide the MFP 10 with the temporary ID by inputting the temporary ID on a web screen provided by the Web server of the MFP 10. Nevertheless, in the first illustrative embodiment, as described above, it is assumed that the mobile terminal 150 and the MFP 10 are not connected to the same LAN. Under this condition, the mobile terminal 150 cannot access the MFP 10 using HTTP communication. Thus, in the first illustrative embodiment, as depicted in cases A in FIGS. 2 and 3, a technique that the mobile terminal 150 provides the MFP 10 with the temporary ID appropriately under a condition where the mobile terminal 150 and the MFP 10 are not connected to the same LAN is adopted.

That is, when the intermediary server 50 acquires the access token 230 from the service providing server 100, the intermediary server 50 generates the temporary ID "xyz". Then, the intermediary server 50 stores the temporary ID in the memory 74 with the temporary ID associated with the access token 230 (e.g., step S30 in FIG. 2). Then, when the intermediary server 50 receives the GET command 252 from the mobile terminal 150 (browser), the intermediary server 50 transmits the redirect command 254 comprising the second combination URL in which the temporary ID is generated, to the mobile terminal 150 (browser). The mobile terminal 150 (browser) transmits the GET command 256 to the intermediary server 50 to receive the message data 258 from the intermediary server 50. As a result, the mobile terminal 150 (browser) displays the message screen 258a (see FIG. 4) thereon.

The user brings the mobile terminal 150 closer to the MFP 10 in accordance with the message 300a indicated on the message screen 258a. As a result, the mobile terminal 150 (OS) transmits the second combination URL to the MFP 10 via NFC to provide the MFP 10 with the temporary ID. Therefore, in contrast to the case where the PC 160 is used (see FIGS. 5 and 6), the user is not required to input the temporary ID to the MFP 10 by operating the operation portion 12 of the MFP 10. Therefore, the temporary ID can be easily provided to the MFP 10. Particularly, when the temporary ID comprises a large number of characters, the technique according to the first illustrative embodiment is effective. According to the first illustrative embodiment, convenience to the user can be increased.

In the first illustrative embodiment, the temporary ID is described in the query part of the second combination URL. Therefore, the mobile terminal 150 can transmit the second combination URL to the MFP 10 in accordance with the system preinstalled on the OS program. That is, the mobile terminal 150 can transmit the second combination URL to the MFP 10 in accordance with the system of transmitting the page URL of the message screen 258a that is active in the foreground via NFC. Further, the mobile terminal 150 (OS) can transmit the temporary ID to the MFP 10 via NFC without a special application program installed on the mobile terminal 150.

As depicted in cases B in FIGS. 5 and 6, there is a possibility that the user desires to allow the MFP 10 to perform the downloading and printing process using the PC 160 not configured to perform NFC. Therefore, the intermediary server 50 prepares the message data 258 as well as the message 300a. The message data 258 represents the message screen 258a comprising the message 300b. Thus, the user can provide the MFP 10 with the temporary ID appropriately in both of the case where the mobile terminal 150 configured to perform NFC is used and the case where the PC 160 not configured to perform NFC is used.

When the MFP 10 receives the second combination URL from the mobile terminal 150 via NFC, the MFP 10 can extract the temporary ID from the second combination URL appropriately. Therefore, the MFP 10 can acquire the access token 230 appropriately from the intermediary server 50 using the temporary ID. Further, the MFP 10 can perform the downloading and printing process appropriately using the access token 230 in response to the data supply service from the service providing server 100.

The MFP 10 is an example of a "communication device". The intermediary server 50 is an example of a "server". The mobile terminal 150 is an example of a "terminal device". The redirect command 254 is an example of "specific data" and an example of a "redirect command". The GET command 252 is an example of a "request". The access token request 280 is an example of a "specific request". The second combination URL is an example of "first location information". The message data 258 is an example of "web data". The message screen 258a is an example of a "message screen". The message 300a is an example of a "one or more instructions". The temporary ID is an example of "target data". The access token 230 is an example of "authentication information". The process of transmitting the access token 230 to the service providing server 100 is an example of a "request authentication".

A second illustrative embodiment will be described below. A description will be given mainly for the parts different from the first illustrative embodiment, and a description will be omitted for the common parts by assigning the same reference numerals thereto. In the first illustrative embodiment, the intermediary server 50 is configured to display the same message screen 258a on both of the mobile terminal 150 and the PC 160 where the mobile terminal 150 is configured to perform NFC is used and where the PC 16 not configured to perform NFC. In the second illustrative embodiment, the intermediary server 50 is configured to display different message screens, e.g., message screens 258a-1 and 258a-2 (see FIGS. 9A and 9B), on the mobile terminal 150 and the PC 160, respectively.

Hereinafter, referring to FIG. 7, case A where the mobile terminal 150 configured to perform NFC is used will be described. Case A in FIG. 7 is a continuation of case A depicted in FIG. 2. In case A of FIG. 7, each communication and each processing are performed similar to case A in FIG. 2. After that, as depicted in FIG. 7, when the mobile terminal 150 (browser) receives the redirect command 250 from the service providing server 100 in step S31 of FIG. 7, the mobile terminal 150 (browser) transmits the GET command 252 comprising OS information to the intermediary server 50 in step S32 of FIG. 7. The OS information represents a name and a version of the OS program of the mobile terminal 150 (e.g., Android 4.0 (Android™ is a trademark owned by Google Inc. of Mountain View, Calif.)). Generally, a system of transmitting a GET command of the HTTP comprising the OS information is installed on the Web browser. Therefore, the mobile terminal 150 (browser) can transmit the GET command 252 comprising the OS information to the intermediary server 50 without a special application installed on the mobile terminal 150.

The memory 74 of the intermediary server 50 prestores information for determination. The information for determination is information in which OS information and NFC information are associated with each other. The OS information is information as to various known OS programs. The NFC information represents whether each OS program supports NFC. The vender of the MFP 10 prestores the information for determination in the memory 74 after investigation of the various known OS programs.

When the determination portion 88 of the intermediary server 50 receives the GET command 252 from the mobile terminal 150 (browser), the determination portion 88 determines whether the OS program of the mobile terminal 150 supports NFC using the OS information comprised in the GET command 252 and the information for determination stored in the memory 74.

In the information for determination stored in the memory 74, the OS information related to the OS program of the mobile terminal 150 and the NFC information representing that the OS program supports NFC are associated with each other. Therefore, in step S33 of FIG. 7, the determination portion 88 determines that the OS program of the mobile terminal 150 supports NFC. In this case, in step S42 of FIG. 7, the preparation portion 85 of the intermediary server 50 acquires a message URL representing a location of message data 258-1 from the memory 74. The message URL " . . . message1" acquired at this time is different from the message URL " . . . message" acquired in step S40 of FIG. 3 in the first illustrative embodiment. The character string "http://www$_{dot}$aa$_{dot}$com/" is omitted and indicated by " . . . ". The preparation portion 85 combines a domain part representing the message URL and a query part in which the temporary ID is generated to generate a second combination URL " . . . message1?ID=xyz".

The memory 74 prestores a first template and a second template. The first template is for generating the message data 258-1 representing the message screen 258a-1 (see FIG. 9). The second template is for generating message data 258-2 representing a message screen 258a-2 (see FIG. 9B). In step S42, the preparation portion 85 further generates the message data 258-1 using the first template. The message data 258-1 comprises text data representing the message 300a and text data representing the message 300b (see FIG. 9A).

A redirect command 254-1 and a GET command 256-1 are similar to the redirect command 254 and the GET command 256, respectively, in FIG. 3, except the second combination URL. When the control device 70 of the intermediary server 50 receives the GET command 256-1 from the mobile terminal 150 (browser) in step S46a of FIG. 7, the control device 70 transmits the message data 258-1 to the mobile terminal 150 (browser) in step S47a of FIG. 7.

Thus, the mobile terminal 150 displays the message screen 258a-1 (see FIG. 9A) thereon. As a result, the user brings the mobile terminal 150 closer to the MFP 10. Although the OS program supports NFC, there may be a case where a device does not contain an NFC I/F. Further, there may be another case where a device comprises an OS program that is the non-NFC capable OS although containing the NFC I/F, i.e., the device is not configured to transmit a URL of a Web page via NFC. In light of this circumstance, in the second illustrative embodiment, the first template is configured such that the message screen 258a-1 comprises the message 300b. Details of processing including and subsequent to this processing are the same as the details of the processing performed in case A in FIG. 3.

Next, referring to FIG. 8, case B where the PC 160 is not configured to perform NFC will be described. Case B in FIG. 8 is a continuation of case B depicted in FIG. 5. In case B in FIG. 8, each communication and each processing are performed similar to case B in FIG. 5. After that, as depicted in step S32 of FIG. 8, the mobile terminal 150 (browser) transmits the GET command 252 comprising the OS information to the intermediary server 50.

In the information for determination stored in the memory 74, the OS information related to the OS program (e.g., Windows® operating system) of the PC 160 and the NFC information representing that the OS program does not support NFC are associated with each other. Therefore, in step S34 of FIG. 8, the determination portion 88 determines that the OS program of the PC 160 does not support NFC. In this case, in step S44 of FIG. 8, the preparation portion 85 of the intermediary server 50 acquires a message URL representing a location of message data 258-2 from the memory 74. The acquired message URL " . . . message2" is different from the message URL " . . . message1" acquired in step S42 of FIG. 7. That is, the acquired message URL " . . . message2" is different in the resource part from the message URL " . . . message1" acquired in step S42 of FIG. 7. In case B in FIG. 9, the query part comprising the temporary ID is not required because it is assumed that the temporary ID is not provided to the MFP 10 via NFC. Therefore, the preparation portion 85 is not configured to generate the second combination URL comprising the message URL and the query part, in contrast to step S42 of FIG. 7.

In step S44 of FIG. 8, the preparation portion 85 generates the message data 258-2 using the second template. The message data 258-2 comprises text data representing a message 300c (see FIG. 9B). Nevertheless, the message data 258-2 does not comprise the message 300a (see FIG. 9A) related to NFC.

A redirect command 254-2 and a GET command 256-2 are similar to the redirect command 254 and the GET command 256, respectively, in FIG. 6, except that the redirect command 254-2 and the GET command 256-2 use the message URL " . . . message2" instead of the second combination URL. When the control device 70 of the intermediary server 50 receives the GET command 256-2 from the mobile terminal 150 (browser) in step S46b of FIG. 8, the control device 70 transmits the message data 258-2 to the mobile terminal 150 (browser) in step S47b of FIG. 8.

Thus, the mobile terminal 150 displays the message screen 258a-2 (see FIG. 9B) thereon. Therefore, the user inputs the temporary ID into the MFP 10 by operating the operation portion 12 of the MFP 10. Details of processing including and subsequent to this processing are the same as the details of processing performed in case B in FIG. 6.

As described above, in the second illustrative embodiment, when the mobile terminal 150 configured to perform NFC is used, the intermediary server 50 can display the message screen 258a-1 comprising the message 300a related to NFC on the mobile terminal 150 appropriately. When the PC 160 not configured to perform NFC is used, the intermediary server 50 displays the message screen 258a-2 comprising the message 300c related to the operation of the MFP 10 but not comprising the message 300a related to NFC, on the PC 160, appropriately.

In the second illustrative embodiment, each of the mobile terminal 150 and the PC 160 is an example of the "terminal device". The OS information is an example of "program information". The redirect command 254-1 and the redirect command 254-2 are examples of the "specific data". The message screen 258a-1 and the message screen 258a-2 are examples of the "message screen". The message 300a is an example of the "one or more instructions". The message 300c is an example of a "one or more instructions".

Next, a third illustrative embodiment will be described below. In the third illustrative embodiment, the intermediary server 50 is configured to display different messages, e.g., message screens 258b-1 and 258a-2 (see FIGS. 9C and 9B) on the mobile terminal 150 and the PC 160, respectively. As depicted in FIG. 9C, the message screen 258b-1 comprises the message 300a and a message 300d. The message 300d is for prompting the user to input the temporary ID by operating the operation portion 12 of the MFP 10 when no reaction occurs although the mobile terminal 150 is brought closer to the MFP 10. That is, the message 300d is different from the message 300b (see FIG. 9A). That is, when a device does not contain an NFC I/F, the message 300d comprises a message for a user of a device that does not contain the NFC I/F. This configuration is adopted because, in the third illustrative embodiment, the intermediary server 50 is configured to recognize that the mobile terminal 150 comprises the NFC I/F 16. Hereinafter, a description will be given mainly for the parts different from the second illustrative embodiment, and a description will be omitted for the common parts by assigning the same reference numerals thereto.

In the case where the mobile terminal 150 is used, the memory 34 of the MFP 10 prestores a URL for NFC "http://www$_{dot}$aa$_{dot}$com/nfc" as the URL of the intermediary server 50 to be transmitted to the mobile terminal 150 via NFC, instead of the URL "http://www$_{dot}$aa$_{dot}$com" of the first illustrative embodiment. Therefore, when an NFC connection is established in FIG. 2, the control device 30 of the MFP 10 transmits the URL for NFC " . . . nfc" to the mobile terminal 150 (OS) via NFC.

Therefore, in FIG. 2, the request destination URL comprised in the GET command 210 is the URL for NFC " . . . nfc". When the control device 70 of the intermediary server 50 receives the GET command 210 comprising the URL for NFC, the control device 70 operates in accordance with a program corresponding to a resource part "nfc". Then, the control device 70 of the intermediary server 50 uses " . . . nfc/id" as the return URL, instead of " . . . id" in the first illustrative embodiment, when transmitting the redirect command 216. As a result, in FIG. 3, the redirect command 250 and the GET command 252 comprise the URL " . . . nfc/id". When the preparation portion 85 of the intermediary server 50 receives the GET command 252 comprising the URL " . . . nfc/id", the preparation portion 85 operates in accordance with the program corresponding to the resource part "nfc/id" of the URL. That is, in step S42 of FIG. 7, the preparation portion 85 generates the message data 258-1 representing the message screen 258b-1 (see FIG. 9C) using a third template prestored in the memory 74. Thus, the mobile terminal 150 can display the message screen 258b-1 thereon. Details of other processing are the same as the details of the processing performed in case A in FIG. 7.

In the case where the PC 160 is used, a URL for non-NFC "http://www$_{dot}$aa$_{dot}$com/nonfc" is described in the instruction manual of the MFP 10 instead of the URL "http://www$_{dot}$aa$_{dot}$com" according to the first illustrative embodiment. The URL for non-NFC " . . . nonfc" is different in the resource part from the URL for NFC " . . . nfc". In FIG. 5, the user inputs the URL for non-NFC into the PC 160.

Therefore, in FIG. 5, the request destination URL comprised in the GET command 210 is the URL for non-NFC " . . . nonfc". When the control device 70 of the intermediary server 50 receives the GET command 210 comprising the URL for non-NFC, the control device 70 operates in accordance with a program corresponding to a resource part "nonfc". Then, the control device 70 of the intermediary server 50 uses " . . . nonfc/id" as the return URL, instead of " . . . id" according to the first illustrative embodiment, when transmitting the redirect command 216. As a result, in FIG. 6, the redirect command 250 and the GET command 252 comprise the URL " . . . nonfc/id". When the preparation portion 85 of the intermediary server 50 receives the GET command 252 comprising the URL " . . . nonfc/id", similar to case B in FIG. 8 according to the second illustrative embodiment, the preparation portion 85 performs the processing of step S44 of FIG. 8 to prepare the redirect command 254-2 and the message data 258-2. Thus, the PC 160 can display the message screen 258a-2 (see FIG. 9B) thereon. Details of other processing are the same as the details of the processing performed in case B in FIG. 8.

As described above, in the third illustrative embodiment, the two different URLs, such as the URL for NFC " . . . nfc" and the URL for non-NFC " . . . nonfc", are used. Therefore, when the URL comprised in the GET command 252 comprises the resource part "nfc/id", the intermediary server 50 can recognize that the mobile terminal 150 comprises the NFC I/F 16. Accordingly, when the intermediary server 50 receives the GET command 252 (see FIGS. 3 and 6), the intermediary server 50 can display an appropriate one of the message screens 258b-1 and 258a-2 (FIGS. 9C and 9B) on each of the mobile terminal 150 and PC 160 in accordance with the URL comprised in the GET command 252. That is, the intermediary server 50 can display an appropriate one of the message screens 258b-1 and 258a-2 (see FIGS. 9C and 9B) on each of the mobile terminal 150 and the PC 160 in accordance with the resource part, e.g., the resource part "nfc/id" or "nonfc/id", comprised in the GET command 252. That is, this configuration enables the mobile terminal 150 comprising the NFC I/F to display an appropriate message screen, e.g., the message screen 258b-1, thereon, and enables a device that might not contain the NFC I/F to display an appropriate message screen, e.g., the message screen 258a-2, thereon. Particularly, the message 300d indicated on the message screen 258b-1 does not comprise a message for the user of the device that does not contain the NFC I/F. Therefore, this configuration can reduce the displaying of an unnecessary message on the mobile terminal 150 comprising the NFC I/F.

According to the second illustrative embodiment, the vender of the MFP 10 needs to prestore the information for determination in the memory 74 of the intermediary server 50. Nevertheless, according to the third illustrative embodiment, the prestorage of the information for determination is not required. Further, according to the second illustrative embodiment, the message screen 258a-2 (see FIG. 9B) may be displayed on the mobile terminal 150 configured to perform NFC if the details of the information for determination are not correct. Nevertheless, according to the third illustrative embodiment, the determination based on the information for determination is not performed. Therefore, the displaying of the unnecessary message can be reduced. Further, the message screens 258b-1 and 258a-2 can be correctly displayed on the mobile terminal 150 and the PC 160, respectively.

In the third illustrative embodiment, the mobile terminal 150 is an example of the "terminal device configured to support communicating using a wireless communication". The PC 160 is an example of a "terminal device not configured to support communicating using a wireless communication". The URL " . . . nfc/id" is an example of "second location information". The URL " . . . nonfc/id" is an example of "third location information". The GET command 252 comprising the URL " . . . nfc/id" is an example of the "first request". The GET command 252 comprising the URL " . . . nonfc/id" is an example of the "second request".

While the disclosure has been described in detail with reference to the specific embodiments thereof, these are merely examples, and various changes, arrangements and modifications may be applied therein without departing from the spirit and scope of the disclosure. For example, variations described below may be applied.

In the first illustrative embodiment, in step S40 of FIG. 3, the preparation portion 85 of the intermediary server 50 is configured to generate the redirect command 254 comprising the second combination URL in which the temporary ID "xyz" is generated. Thus, the message data 258 is transmitted to the mobile terminal 150 (browser) after communication of the redirect command 254 and the GET command 256 is performed. Nevertheless, in other embodiments, for example, in step S40, the preparation portion 85 may be configured to prepare the message data 258 to be transmitted as a response to the GET command 252 without generating the second combination URL. That is, the preparation portion 85 may be configured to prepare the message data 258 comprising the return URL " . . . id" in which the temporary ID is not generated, as the page URL. Further, the preparation portion 85 may be configured to describe the temporary ID "xyz" in a predetermined part of the message data 258, i.e., a part different from the page URL. The first transmission portion 83 of the intermediary server 50 may be configured to transmit the message data 258 to the mobile terminal 150 as a response to the GET command 252. That is, communication of the redirect command 254 and the GET command 256 may be omitted.

According to the first illustrative embodiment, the mobile terminal 150 (OS) is not configured to perform a series of processing. The series of processing comprises the extraction of the temporary ID from the predetermined part of the message data 258 and the transmission of the temporary ID to the MFP 10 via NFC. That is, a special application needs to be installed on the mobile terminal 150 to allow the mobile terminal 150 to perform the series of processing. Nevertheless, in other embodiments, for example, the mobile terminal 150 (OS) may be configured to perform the series of processing. Therefore, the mobile terminal 150 (OS) may be configured to extract the temporary ID from the predetermined part of the message data 258 and transmit the temporary ID to the MFP 10 via NFC without a special application installed on the mobile terminal 150. In this case, communication of the redirect command 254 and the GET command 256 may can be omitted. In the other embodiments, the message data 258 in which the temporary ID "xyz" is generated in the predetermined part may be an example of the "specific data". Generally speaking, the "specific data" may be data comprising target data and for displaying the web screen on the terminal device.

The "target data" is not limited to the temporary ID. In other embodiments, for example, the "target data" may be any data that is to be provided from the server (e.g., the intermediary server 50) to the terminal device (e.g., the mobile terminal 150) via the communication device (e.g., the MFP 10). For example, the server may be configured to store an address book registered by the user. In this case, the "target data" may be, for example, data representing the address book. The server may be configured to store settings information to be newly used by the communication device. In this case, the "target data" may be, for example, data representing the settings information. For example, printing settings information such as a printing resolution and a sheet size or scanning settings information such as a scanning resolution and a file format of scan data may be an example of the settings information.

The service that the MFP 10 obtains from the service providing server 100 is not limited to the data supply service. In other embodiments, for example, in case A in FIG. 3, the processing execution portion 42 of the MFP 10 may be configured to allow the scanning execution portion 20 to scan a document to generate scan data instead of transmitting the file acquirement request 290. Then, the processing execution portion 42 may be configured to transmit a file storage request (e.g., a POST command of the HTTP) comprising the scan data and the access token 230 to the service providing server 100. In this case, when authentication of the access token 230 succeeds, the service providing server 100 may store a file comprising scan data in a memory (not depicted) of the service providing server 100. That is, the service providing server 100 may be configured to offer the data storage service. With this configuration, the MFP 10 can perform the scanning and uploading process in response to the data storage service of the service providing server 100. In other words, the user can let the MFP 10 perform the scanning and uploading process by using the mobile terminal 150. In this case, the transmission process of the access token 230 and the scanning and uploading process of the access token 230 is an example of the "request authentication". The "request authentication" may be another process (e.g., a process of printing target data) other than the transmission process and the scanning and uploading process of the access token 230.

The "authentication information" is not limited to the access token. In other embodiments, for example, the "authentication information" may be another information (e.g., the user ID and/or the password) to be used by the respective service providing servers 100 and 110.

Wi-Fi communication (i.e., HTTP communication) is applied to the embodiments in this disclosure. In other embodiments, for example, another wireless communication such as third Generation in compliance with standards of the International Mobile Telecommunication-2000 ("IMT-2000) may be applied to the embodiments of this disclosure. Instead of HTTP communication, communication in accordance with another protocol for web data communication (e.g., Hypertext Transfer Protocol Secure ("HTTPS") according to HTTP) may be used. The "wireless communication" is not limited to NFC either. The "wireless communication" may be, for example, infrared communication or BlueTooth® communication (BlueTooth® is a registered trademark of BLUETOOTH SIG. INC. of Kirkland, Wash.).

In each of the above-described illustrative embodiments, the message screen 258a comprising the message 300a indicating such that "Please bring your mobile terminal closer to the MFP." is an example of the "message screen". Nevertheless, in other embodiments, for example, the "message screen" may comprise a message indicating "Please let your mobile terminal perform NFC." That is, the "web screen" may comprise a message indicating that the terminal device is allowed to perform the wireless communication. Generally speaking, the "message screen" may be configured to indicate at least the method of transmitting the target data to the communication device.

In each of the above-described illustrative embodiments, the intermediary server 50 comprises a single device. Nevertheless, in other embodiments, for example, the intermediary server 50 may comprise two or more devices that are independent from each other. For example, the intermediary server 50 may comprise a first device and a second device when the intermediary server 50 receives the GET command 210 in FIG. 2. In this case, the first device may be configured to perform a processing of transmitting the service list data 212. The second device may be configured to receive the GET command 252 in FIG. 3 and perform processing of step S40 and subsequent steps. Generally speaking, the "specific server" may comprises a physically single device or two or more independent devices.

In each of the above-described illustrative embodiments, each function of the portions 41 to 43 and 81 to 88 is implemented by one of the CPU 32 of the MFP 10 and the CPU 72 of the intermediary server 50 to perform processing in accordance with software. Instead of this, part of the functions of the portions 41 to 43 and 81 to 88 may be implemented by hardware such as a logical circuit.

What is claimed is:

1. A system comprising:
    a server; and a communication device,
    wherein the server comprises:
        a first processor; and
        a first memory configured to store authentication information configured to authenticate the communication device to a service providing server, target data associated with the authentication information and first computer-readable instructions therein that, when executed by the first processor, cause the server to:
            receive a request from a terminal device using a protocol configured to be used by a browser of the terminal device;
            generate, in response to receiving the request, specific data comprising first location information identifying a location on the server of web data, the web data for displaying a message screen, the message screen including transmission instruction for transmitting target data from the terminal device to a communication device using a short-range wireless communication, the specific data configured to be in a format for transmission using the protocol; and
            transmit the specific data to the terminal device;
    wherein the communication device comprises:
        a second processor;
        a network communication interface for performing the network communication;
        a printing execution portion configured to print; and
        a second memory configured to store second computer-readable instructions therein that, when executed by the second processor, cause the communication device to:
            receive the specific data from the terminal device using the short-range wireless communication between the terminal device and the communication device, the specific data comprising the target data; and
            transmit the target data to the server;
    wherein the first computer-readable instructions cause the server to:
        receive from the communication device the target data transmitted by the server to the terminal device; and
        transmit, to the communication device, the authentication information associated with the received target data,
    wherein the second computer-readable instructions cause the communication device to:
        receive the authentication information from the server; and
        request authentication to the service providing server using the received authentication information,
    wherein the computer-readable instruction further cause the communication device to:
        acquire data for printing from the service providing server using the network interface, after requesting authentication to the service providing server using the received authentication information; and
        instruct the print execution portion to print using the acquired data.

2. A non-transitory computer-readable medium storing computer-readable instructions therein that, when executed by a processor of a server, cause the server to:
    receive a request and program information from a terminal device using a protocol configured to be used by a browser of the terminal device, the program information identifying a program which is installed in the terminal device;
    determine whether the program installed in the terminal device is configured to support communicating using a short-range wireless communication or not, based on the received program information;
    generate one of first specific data and second specific data,
    in response to determining that the program installed in the terminal device is configured to support communicating using the short-range wireless communication, the first specific data is generated, the first specific data comprising first location information identifying a location on the server of first web data, the first web data for displaying a first message screen, the first message screen including transmission instruction for transmitting target data from the terminal device to a communication device using the short-range wireless communication, a range of the short-range wireless communication is shorter than a range of Wi-Fi communication, the first message screen is configured to display one or more instructions for bringing the terminal closer to the communication device,
    in response to determining that the program installed in the terminal device is not configured to support communicating using the short-range wireless communication, the second specific data is generated, the second specific data comprising second location information identifying a location on the server of second web data, the second web data for displaying a second message screen, the second message screen is configured to display one or more instructions for inputting the target data by operating the communication device, the target data is stored in a memory of the server associated with authentication information configured to authenticate the communication device to a service providing server, the first specific data and the second specific data configured to be in a format for transmission using the protocol;
    transmit one of the first specific data and the second specific data including the target data to the terminal device;
    receive, from the communication device, the target data transmitted by the server to the terminal device; and
    transmit, to the communication device, the authentication information from the memory, the authentication information associated with the received target data.

3. The medium according to claim 2,
    wherein the generating the first specific data comprises generating a redirect command configured to cause the terminal device to acquire the first web data based on the first location information for location of the first web data; and
    wherein the, generating the second specific data comprises generating a redirect command configured to cause the terminal device to acquire the second web data based on the second location information for location of the second web data.

4. The medium according to claim 2,
    wherein the computer-readable instructions further cause the server to:
    generate the target data:
    wherein the generating the first specific data comprises generating the first specific data including the generated target data; and
    wherein the generating the second specific data comprises generating the second specific data including the generated target data.

5. The medium according to claim 4,
wherein the computer-readable instructions further cause the server to:
acquire the authentication information from the service providing server; and
cause the memory to store, in response to acquiring the authentication information, the generated target data and the acquired authentication information associated with each other.

6. The medium according to claim 2,
wherein the first specific data comprises a Uniform Resource Locator comprising the first location information and the target data; and
wherein the second specific data comprises a Uniform Resource Locator comprising the second location information and the target data.

7. The medium according to claim 6,
wherein the protocol comprises a hypertext transfer protocol; and
wherein the first specific data and the second specific data are configured to be in a Uniform Resource Locator format for transmission using the hypertext transfer protocol.

8. The medium according to claim 2,
wherein the computer-readable instructions further cause the server to:
receive a specific request including the target data from the communication device, after transmitting one of the first specific data and the second specific data to the terminal device; and
transmit, to the communication device, the stored authentication information associated with the received target data which is included in the received specific request, in response to receiving the specific request.

9. A non-transitory computer-readable medium storing computer-readable instructions therein that, when executed by a processor of a server, cause the server to:
receive one of a first request and a second request from a terminal device using a protocol configured to be used by a browser of the terminal device, the first request is configured to be transmitted to the server using second location information for location of the server, from the terminal device configured to support communication using a short-range wireless communication, and the second request is configured to be transmitted to the server using third location information for location of the server, from the terminal device not configured to support communicating using the short-range wireless communication,
generate, in response to receiving the first request, first specific data comprising first location information identifying a location on the server of first web data, the first web data for displaying a first message screen, the first message screen including transmission instruction for transmitting target data from the terminal device to a communication device using the short-range wireless communication, a range of the short-range wireless communication is shorter than a range of Wi-Fi communication, the first message screen is configured to display one or more instructions for bringing the terminal closer to the communication device;
generate, in response to receiving the second request, second specific data, the second specific data comprising second location information identifying a location on the server of the second web data, the second web data for displaying a second message screen, the second message screen is configured to display one or more instructions for inputting the target data by operating the communication device;
transmit one of the first specific data and the second specific data including the target data to the terminal device;
receive, from the communication device, the target data transmitted by the server to the terminal device; and
transmit, to the communication device, the authentication information from the memory., the authentication information associated with the received target data.

10. The medium according to claim 9,
wherein the first request is configured to be transmitted using a Uniform Resource Locator as the second location information, and
wherein the second request is configured to be transmitted using a Uniform Resource Locator as the third location information.

11. A communication device comprising:
a processor; and
a short range wireless communication interface for receiving specific data from a terminal device using short-range wireless communication between the terminal device and the communication device;
a network communication interface for performing network communication;
a printing execution portion configured to print; and
a memory configured to store computer-readable instructions therein that, when executed by the processor, cause the communication device to:
receive the specific data from the terminal device using the short-range wireless communication between the terminal device and the communication device, the specific data comprising target data, the specific data is configured to be in a format for transmission using a protocol configured to be used by a browser of the terminal device;
transmit the target data to a server using the network communication;
receive authentication information associated with the target data from the server using the network communication; and
request authentication to a service providing server using the received authentication information using the network communication;
wherein a range of the short range wireless communication interface of the communication device is shorter than a range of Wi-Fi communication;
wherein the computer-readable instruction further cause the communication device to:
acquire data for printing from the service providing server using the network interface, after requesting authentication to the service providing server using the received authentication information; and
instruct the print execution portion to print using the acquired data.

12. The communication device according to claim 11,
wherein the specific data comprising a Uniform Resource Locator including the target data, the specific data is configured to be in a Uniform Resource Locator format for transmission using the protocol configured to be used by a browser of the terminal device.

13. The communication device according to claim 12,
wherein the computer-readable instructions further cause the communication device to:
extract the target data from the Uniform Resource Locator.

14. The communication device according to claim 11, wherein the short range wireless communication interface comprises near field communication interface.

15. A communication device comprising:
a processor;
a short range wireless communication interface for receiving specific data from a terminal device using short-range wireless communication between the terminal device and the communication device;
a network communication interface for performing network communication;
a scanning execution portion configured to scan a document to generate scan data; and
a memory configured to store computer-readable instructions therein that, when executed by the processor, cause the communication device to:
receive the specific data from the terminal device using the short-range wireless communication between the terminal device and the communication device, the specific data comprising target data, the specific data is configured to be in a format for transmission using a protocol configured to be used by a browser of the terminal device;
transmit the target data to a server using the network communication;
receive authentication information associated with the target data from the server using the network communication; and
request authentication to a service providing server using the received authentication information using the network communication;
wherein a range of the short range wireless communication interface of the communication device is shorter than a range of Wi-Fi communication;
wherein the computer-readable instruction further cause the communication device to:
instruct the scan execution portion to scan the document to generate the scan data;
wherein the requesting authentication comprising transmitting the scanned data and the authentication information for uploading the scanned data to the service providing server using the network communication interface.

16. The communication device according to claim 15, wherein the short range wireless communication interface comprises near field communication interface.

17. A system comprising:
a server; and a communication device,
wherein the server comprises:
a first processor; and
a first memory configured to store authentication information configured to authenticate the communication device to a service providing server, target data associated with the authentication information and first computer-readable instructions therein that, when executed by the first processor, cause the server to:
receive a request from a terminal device using a protocol configured to be used by a browser of the terminal device;
generate, in response to receiving the request, specific data comprising first location information identifying a location on the server of web data, the web data for displaying a message screen, the message screen including transmission instruction for transmitting target data from the terminal device to a communication device using a short-range wireless communication, the specific data configured to be in a format for transmission using the protocol; and
transmit the specific data to the terminal device;
wherein the communication device comprises:
a second processor;
a network communication interface for performing network communication;
a scanning execution portion configured to scan a document to generate scan data; and
a second memory configured to store second computer-readable instructions therein that, when executed by the second processor, cause the communication device to:
receive the specific data from the terminal device using the short-range wireless communication between the terminal device and the communication device, the specific data comprising the target data; and
transmit the target data to the server;
wherein the first computer-readable instructions cause the server to:
receive from the communication device the target data transmitted by the server to the terminal device; and
transmit, to the communication device, the authentication information associated with the received target data,
wherein the second computer-readable instructions cause the communication device to:
receive the authentication information from the server; and
request authentication to the service providing server using the received authentication information,
wherein the computer-readable instruction further cause the communication device to:
instruct the scan execution portion to scan the document to generate the scan data;
wherein the requesting authentication comprising transmitting the scan data and the authentication information for uploading the scan data to the service providing server using the network communication interface.

* * * * *